(12) United States Patent
Cooper

(10) Patent No.: US 12,340,065 B2
(45) Date of Patent: Jun. 24, 2025

(54) GRAPHICAL USER INTERFACE DEVICE AND METHOD

(71) Applicant: CORE NETWORK LTD., London (GB)

(72) Inventor: Ross Cooper, Stanford-le-Hope (GB)

(73) Assignee: CORE NETWORK, LTD., London (GB)

(*) Notice: Subject to any disclaimer, the term of this patent is extended or adjusted under 35 U.S.C. 154(b) by 0 days.

(21) Appl. No.: 16/492,367

(22) PCT Filed: Mar. 8, 2018

(86) PCT No.: PCT/GB2018/050598
§ 371 (c)(1),
(2) Date: Sep. 9, 2019

(87) PCT Pub. No.: WO2018/162916
PCT Pub. Date: Sep. 13, 2018

(65) Prior Publication Data
US 2021/0132745 A1    May 6, 2021

(30) Foreign Application Priority Data
Mar. 8, 2017 (GB) .................................. 1703740

(51) Int. Cl.
*G06F 3/0482* (2013.01)
*G06F 3/04847* (2022.01)
(52) U.S. Cl.
CPC ........ *G06F 3/0482* (2013.01); *G06F 3/04847* (2013.01)
(58) Field of Classification Search
CPC ............................ G06F 3/0482; G06F 3/04847
See application file for complete search history.

(56) References Cited

U.S. PATENT DOCUMENTS

2006/0095865 A1* 5/2006 Rostom ................. G06F 3/0482
715/810
2008/0022228 A1* 1/2008 Kwon ................... G06F 3/0482
715/838

(Continued)

FOREIGN PATENT DOCUMENTS

EP    1 883 009    1/2008

OTHER PUBLICATIONS

International Search Report for PCT/GB2018/050598 mailed Aug. 6, 2018, 2 pages.

*Primary Examiner* — Haoshian Shih
(74) *Attorney, Agent, or Firm* — Nixon & Vanderhye, P.C.

(57) ABSTRACT

The present invention relates to a computer-implemented of controlling an electronic device with a display and a user input. The method includes the steps of: displaying a first visual object within a graphical user interface; wherein the first visual object comprises a plurality of first visual elements, and wherein the first visual elements are displayed in a first visual state in a ring within the graphical user interface; detecting a first user input event at one of the first visual elements; in response to the first user input event, displaying a second visual object within the graphical user interface; wherein the second visual object comprises a plurality of second visual elements, and wherein the second visual elements are displayed in a ring surrounding the first visual object within the graphical user interface; detecting a second user input event at one of the second visual elements; and, in response to the second user input event, controlling the electronic device to access functionality associated with the second visual element. An electronic device and a computer program are also disclosed.

25 Claims, 16 Drawing Sheets

(56) References Cited

U.S. PATENT DOCUMENTS

| | | | | |
|---|---|---|---|---|
| 2010/0306702 A1* | 12/2010 | Warner | ............... | G06F 3/04817 |
| | | | | 715/811 |
| 2012/0173975 A1* | 7/2012 | Herz | ................. | H04N 21/4312 |
| | | | | 715/830 |
| 2012/0226978 A1* | 9/2012 | Harberts | ............... | G06F 3/0485 |
| | | | | 715/702 |
| 2013/0047123 A1* | 2/2013 | May | .................... | G06F 3/04817 |
| | | | | 715/834 |
| 2013/0104079 A1* | 4/2013 | Yasui | .................... | G06F 3/0482 |
| | | | | 715/834 |
| 2013/0311918 A1* | 11/2013 | McCoy | .................... | G06F 8/38 |
| | | | | 715/765 |
| 2015/0205455 A1* | 7/2015 | Shaw | ................. | G06F 3/04842 |
| | | | | 715/834 |

\* cited by examiner

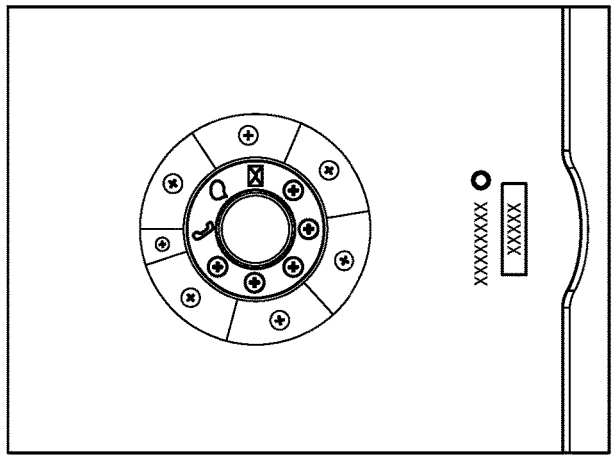

12. 'Customise Model' Allows Full Control and Customization of the Users Core. Whilst in Customise Mode the User is Able to Click or Press Any Part of the Screen Including Background Core, Loops & Paths etc. The User will then be Presented with Options Allows the Customisation of Each Section.

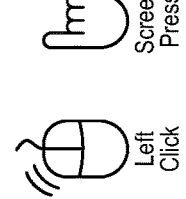

Left Click   Screen Press

Open the Customise Panel for a Given Area

FIG. 5L

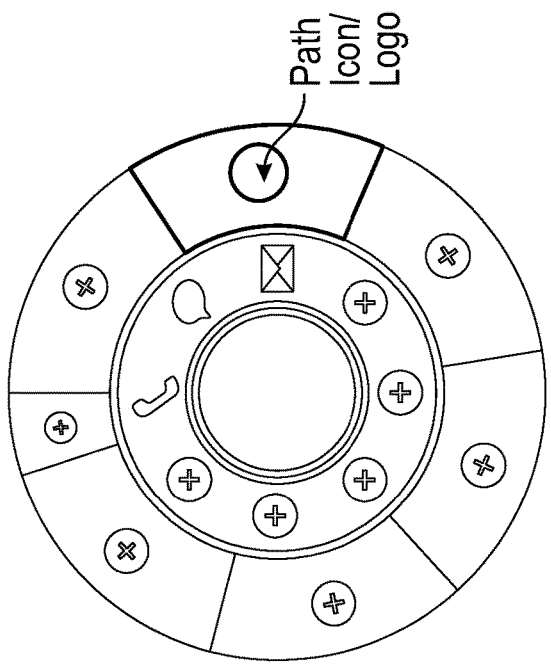

Path Icon/ Logo

11. The 'Path Icon/Logo' is a Simple Graphic that Describes the Pathdestination

FIG. 5K

GRAPHICAL USER INTERFACE DEVICE AND METHOD

This application is the U.S. national phase of International Application No. PCT/GB2018/050598 filed Mar. 8, 2018 which designated the U.S. and claims priority to GB Patent Application No. 1703740.9 filed Mar. 8, 2017, the entire contents of each of which are hereby incorporated by reference.

FIELD OF INVENTION

The present invention is in the field of graphical user interfaces. More particularly, but not exclusively, the present invention relates to controlling access within an electronic device using a graphical user interface.

BACKGROUND

Electronic devices ordinarily comprise application software and operating system software.

Operating system software includes the core operating system which mediates between application software and devices via libraries and device drivers.

Operating system software libraries may include a graphical user interface to facilitate the capture of user input effectively via a display device and user input device.

Examples of graphical user interfaces can be found in Window 8 which provides a graphical user interface for touch-screen devices called Surface, and Apple iOS which provides a graphical user interface called Cocoa Touch.

Existing graphical user interfaces provide various modalities to enable a user to interact with applications executing within the core operating system on a device. For example, Cocoa Touch provides multiple flags to enable application developers to receive user input via multi-touch input devices.

New device form factors, such as smaller screens for internet-enabled mobile devices such as phones, phablets, and tablets, introduce new constraints for graphical user interfaces. New input apparatus, in turn, provide for greater opportunity for device interaction. And lastly, new applications and wider user-bases may require greater usability.

Therefore, there is a desire to provide an enhanced graphical user interfaces to improve user-machine interaction.

It is an object of the present invention to provide a graphical user interface device and method which overcomes the disadvantages of the prior art, or at least provides a useful alternative.

SUMMARY OF INVENTION

According to a first aspect of the invention there is provided a computer-implemented method of controlling an electronic device with a display and a user input, including:
Displaying a first visual object within a graphical user interface; wherein the first visual object comprises a plurality of first visual elements, and wherein the first visual elements are displayed in a first visual state in a ring within the graphical user interface;
Detecting a first user input event at one of the first visual elements;
In response to the first user input event, displaying a second visual object within the graphical user interface; wherein the second visual object comprises a plurality of second visual elements, and wherein the second visual elements are displayed in a ring surrounding the first visual object within the graphical user interface;
Detecting a second user input event at one of the second visual elements; and
In response to the second user input event, controlling the electronic device to access functionality associated with the second visual element.

The plurality of second visual elements may be associated with one of the first visual elements.

At least some of the plurality of first visual elements may be associated with a plurality of second visual elements.

The method may include, in response to the first user input event, changing the first visual elements from the first visual state to a second visual state within the graphical user interface. The second visual state may be smaller than the first visual state. The second visual state may include a thinner segment size than the first visual state.

The electronic device may be controlled to access functionality or content by transmitting an operating system message to an application. The application may be executing on the electronic device.

The graphical user interface may be executing within a graphical user interface layer within the operating system.

The graphical user interface may be executing as a software library on the device.

The first visual elements may be displayed in the first ring surrounding a third visual object. The third visual object may comprise a plurality of third visual elements. At least some of the third visual elements may be displayed in a third ring within the graphical user interface.

The method may further include: detecting a third user event at one of the visual objects, wherein the third user event includes user input movement; and in response to the third user event, when the user input movement exceeds a threshold, rotating visual elements of the visual object around the ring displayed within the graphical user interface. During rotation of the visual elements, at least one of the visual elements may be hidden and at least one of visual elements may be revealed within the ring in the graphical user interface.

The functionality may include display of another visual object comprising a plurality of visual elements, at least some of the visual elements being displayed in a ring within the graphical user interface and surrounding the second visual object.

At least one of the visual objects may include a customisation visual element, and wherein actuation of the customisation visual element facilitates the addition of a new visual element to that visual object.

The method may further include detecting a fourth user input event at one of the visual elements at one of the visual objects; and in response to the fourth user input event, facilitating rearrangement of the visual element within the ring at the visual object.

The method may further include: in response to the first user input event, rotating the first visual elements within the first ring within the graphical user interface until the one of the first visual elements is at the top of the ring.

Each displayed visual element may form a segment within the ring within the graphical user interface.

According to a second aspect of the invention there is provided an electronic device, including:
A display;
One or more processors;
Memory;
A user input; and One or more programs wherein the one or more programs are stored in the memory and configured to be executed by the one or more processors, the programs including instructions for:

Displaying a first visual object within a graphical user interface; wherein the first visual object comprises a plurality of first visual elements, and wherein the first visual elements are displayed in a first visual state in a first ring within the graphical user interface;

Detecting a first user input event at one of the first visual elements;

In response to the first user input event, displaying a second visual object within the graphical user interface; wherein the second visual object comprises a plurality of second visual elements, and wherein the second visual elements are displayed in a second ring surrounding the first visual object within the graphical user interface;

Detecting a second user input event at one of the second visual elements; and

In response to the second user input event, controlling the electronic device to access functionality or content associated with the second visual element.

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides a graphical user interface device and method.

Figure 1:
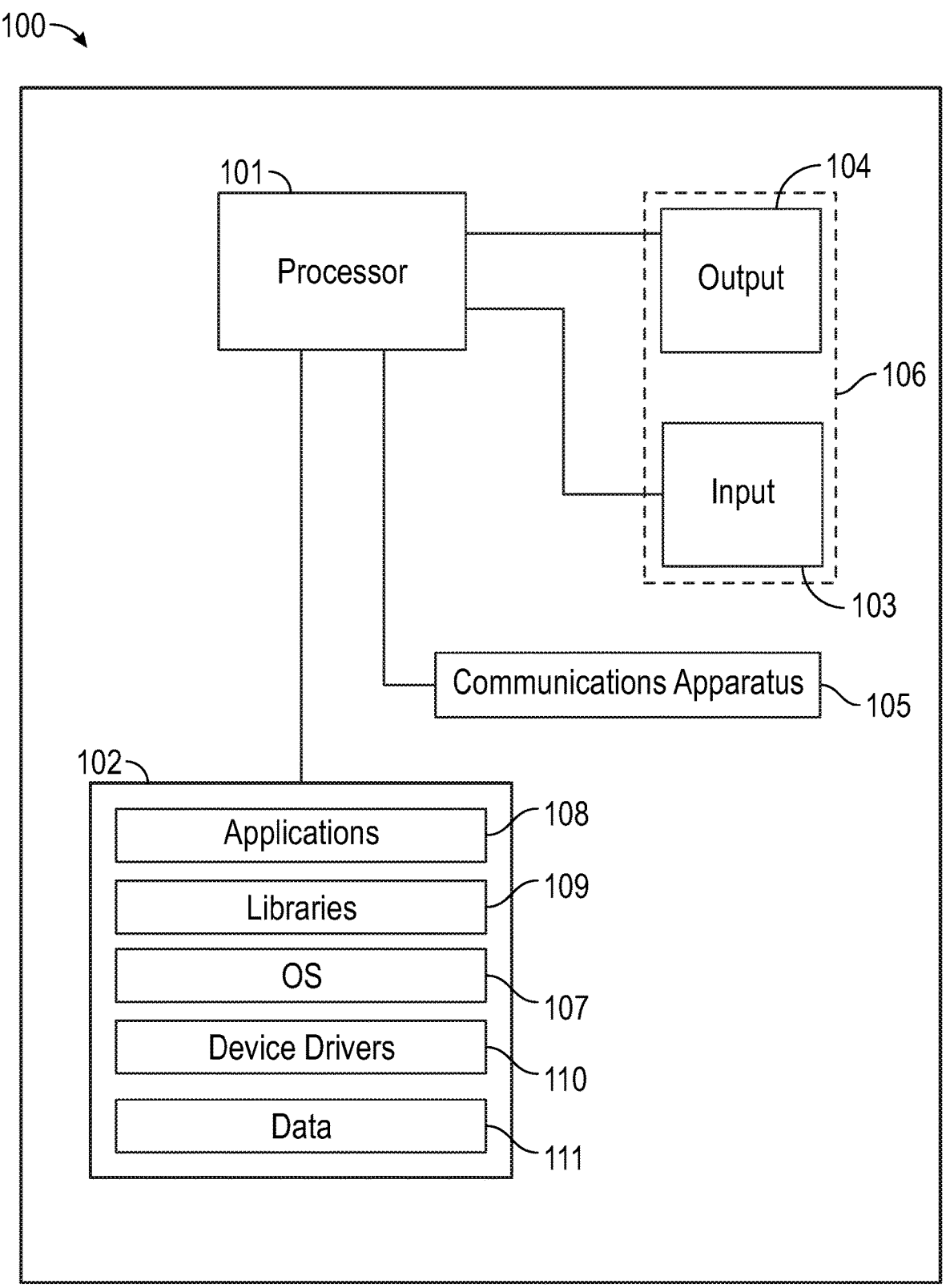
FIG. 1: shows a block diagram illustrating an electronic device in accordance with an embodiment of the invention.

In FIG. 1, an electronic device 100 in accordance with an embodiment of the invention is shown.

The device 100 includes a processor 101, a memory 102, a user input apparatus 103, and a display apparatus 104. The device 100 may also include a communications apparatus 105.

The input apparatus 103 may include one or more of a touch/near-touch input, an audio input, a keyboard, a pointer device (such as a mouse), or any other type of input.

The display apparatus 104 may include one or more of a digital screen (such as an LED or OLED screen), an e-ink screen, or any other type of display.

The input and display apparatuses 103 and 104 may form an integrated user interface 106 such as a touch or near-touch screen.

The device 100, or at least parts of the device, may constitute a personal computing device such as a desktop or laptop computer, or a mobile device 100, such as a smartphone or a tablet. The device 100 may include a common operating system 107 such as Apple iOS, Google Android, or Microsoft Windows Phone for mobile devices or Microsoft Windows or Apple OSX for personal computing devices.

The processor 101 may be configured to display a first visual object within a graphical user interface. The first visual object may be comprised of a plurality of first visual elements. At least some of the first visual elements may be displayed within a ring within the graphical user interface. The visual elements may be visually represented as segments in that ring.

The processor 101 may be further configured to detect user input events at the first visual elements. In response to the user input events, the processor 101 may be configured to display a second visual object within the graphical user interface. The second visual object may be comprised of a plurality of second visual elements. At least some of the second visual elements may be displayed within a second ring within the graphical user interface. The visual elements may be visually represented as segments in that ring.

The processor 101 may be further configured to detect user input events at the second visual elements. In response to the user input events, the processor 101 may be configured to control access within the device 100 to functionality or content. For example, the functionality may be features within application software or the operating system, and the content may be content defined within application software or retrieved across a network from another device or server. The functionality or the content may be provided to the user on the device 100.

The memory 102 may be configured to store software applications 108, libraries 109, the operating system 107, device drivers 110, and data 111.

The processor 101 is configured to execute the software applications 108, libraries 109, operating system 107, and device drivers 110, and to retrieve data 111.

The communications apparatus 105 may be configured to communicate with one or more other devices or servers via a communications interface such as wifi, Bluetooth, and/or cellular (e.g. 2G, 3G, or 4G) and/or across a network (such as a cellular network, a private LAN/WLAN and/or the Internet).

Figure 2:
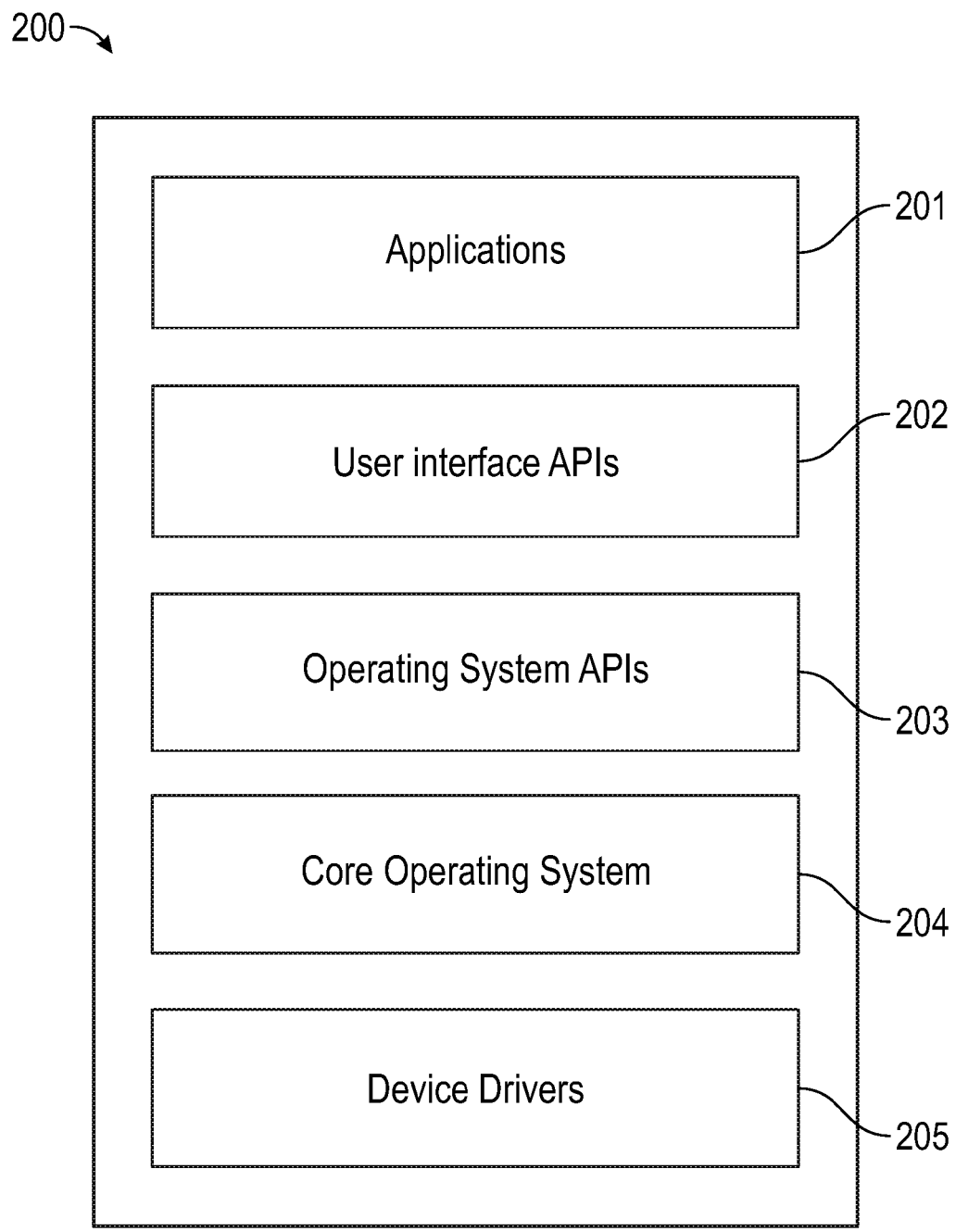
FIG. 2: shows a block diagram illustrating a software architecture for the electronic device in accordance with an embodiment of the invention.

Referring to FIG. 2, the various layers of the architecture 200 of the device 100 will be described.

Software applications 201 are provided at a top layer. Below this layer are user interface APIs 202 which provide access for the application software 201 to user interface libraries. Below this layer are operating system APIs 203 which provide access for the application software 201 and user interface libraries to the core operating system 204. Below the core operating system 204 are the device drivers 205 which provide access to the input 103, output 104, and communication 105 apparatuses.

Figure 3:
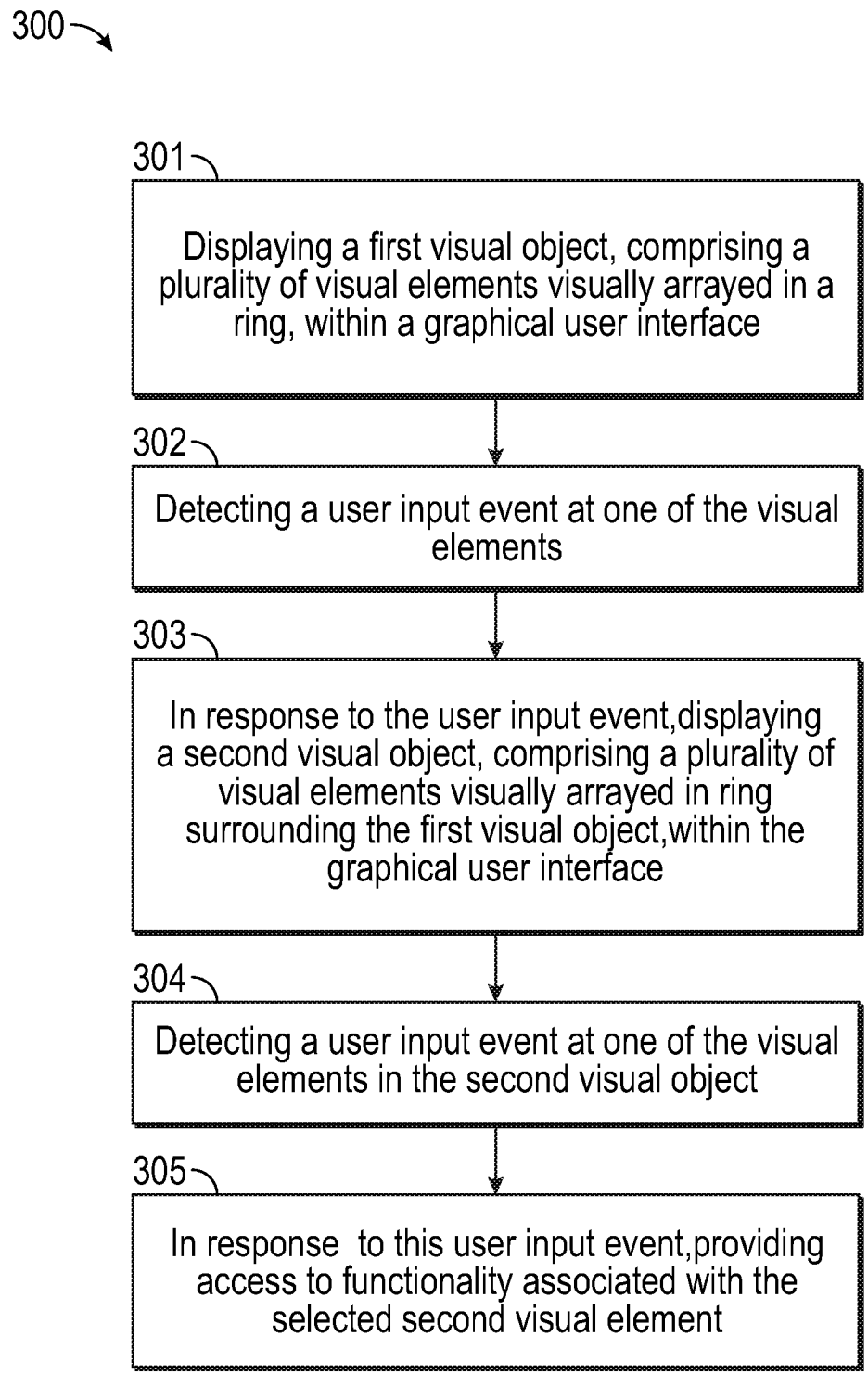
FIG. 3: shows a flow diagram illustrating a method in accordance with an embodiment of the invention.

With reference to FIG. 3, a method 300 in accordance with an embodiment of the invention will be described.

In step 301, a first visual object is displayed within a graphical user interface (GUI) (for example, by processor 101 via a call from an application in the application layer 201 to the user interface API layer 202) at a device (e.g. 100). The graphical user interface may be displayed within display 104. The first visual object comprises a plurality of first visual elements. At least some of the visual elements are displayed in the GUI in a ring, for example, such that these visual elements are visible in the GUI. The other visual elements may be hidden in the GUI. Each visual element may be visually represented as a segment within the ring. The visual elements may include text and/or one or more icons or graphics. The text and/or icons or graphics may be unique to that visual element. Each visual element may be uniquely associated with a colour.

In step 302, a user input event may be detected at one of the visual elements in the first visual object. The user input event may be detected from input 103 by the processor 101 via the device driver layer 205. The user input event may be iterated from the device driver layer 205 through to the operating system layer 204 and then to a user interface library stored at 109.

In step 303, in response to the user input event in step 302, a second visual object is displayed within the GUI (for example, by processor 101). The second visual object comprises a plurality of second visual elements. At least some of these visual elements are displayed in the GUI in a ring (e.g. with some visible and some hidden). Each visual element may be visually represented as a segment within the ring. The visual elements may include text or one or more icons or graphics. The text and/or icons or graphics may be unique to that visual element. Each visual element may be uniquely associated with a colour.

The arc-size of the segments of the first and/or second visual elements within their respective rings may be determined by the number of the visual elements within that ring and the size of the ring. In another embodiment, the arc-size may be pre-defined and/or fixed. In one embodiment, user input may be received to change the arc-size of a segment of one of the first or second visual elements relative to the other visual elements within their ring.

The second visual elements may be associated with the first visual element at which the user input event was detected. In one embodiment, at least some of the first visual elements are each associated with a plurality of second visual elements, such that when the user input event is detected at one first visual element, the associated second visual elements are displayed in the second visual object. In this way the first and second visual elements may form, conceptually, a tree hierarchy. For example, the first visual element for the associated second visual element(s) may be considered a category for the second visual element(s).

In one embodiment, in response to the above user input event, the displayed first visual elements may change from a first visual state to a second visual state. For example, the first visual elements may change in size (e.g. by reducing segment thickness) or colour. In this way, less screen "real estate" may be occupied by the first visual object but access and visibility of the first visual object is still provided to indicate context to a user and to potentially provide functionality. For example, in one embodiment, another user input event may be detected after the first, at another of the first visual elements. The second visual elements may be changed to those second visual elements associated with this other first visual element.

In one embodiment, in response to the above user input event, the first visual element at which the user input event is detected may be displayed at the top of its ring within the first visual object. For example, the ring may be rotated to position this first visual element at the top or apex of the ring within the GUI. In one embodiment, and in response to the above user input event, a visual characteristic of all the first visual element may be modified except at the first visual element at which the user input event is detected. For example, the visual characteristic may be colour or hue, and the colour or hue of the visual elements may be darkened or faded or greyed out. In this way, the "selected" visual element may be highlighted to provide a contextual indicator to the user's interaction.

In step 304, a user input event may be detected at one of the visual elements in the second visual object.

In step 305, in response to the user input event in step 302, the device 100 may be controlled to provide access to functionality or content (e.g. via processor 101). For example, a message may be provided via operating system to the application which has called for the user interface (e.g. via user interface API layer 202). In this example, the application may be "listening" for the message or the message may be provided via an interrupt.

In one embodiment, the functionality and/or content may be a local application to execute/executing on the device 100, a web application to execute/executing on the device 100, and/or a website/webpage to be rendered within a browser or webkit to execute/executing on the device 100. The local application, web application, and/or website/webpage may be displayed and operate within a display panel. The display panel may be overlaid on top of, at least, a part of the first and second visual objects. The display panel may slide across the display of the device 100 from an edge to cover, at least, a part of the first and second visual objects. The display panel may include a user actuate-able user interface element such as a button, that, upon actuation, closes or hides the display panel such that the first and second visual objects are visible again.

In one embodiment, a third visual object is displayed within the GUI. The third visual object comprises a plurality of third visual elements. This third visual object is displayed within the first visual object such that first visual elements of the first visual object surround the third visual object in a ring. Some or all of the third visual elements may also be displayed in a ring in the GUI. This ring may surround another visual object. The another visual object may be a central visual object that is displayed in the centre of the third visual object ring, sitting inside the first visual object ring, sitting inside the second visual object ring. The central visual object may be actuated by the user to perform one or more functions. One function may be to hide one or more outer rings (e.g. the second visual object ring if displayed).

In one embodiment, each of the third visual elements is associated with functionality and/or content such that actuation of a third visual element by a user activates the functionality and/or content. One or all of the third visual elements may be device 100 operating system functionality.

User input events including input movement may be detected at one or more of the visual objects, and in response, the visual elements within the ring for that visual object may be rotated clockwise or counter-clockwise (for example, in dependence on the nature of the input movement). In one embodiment, some of the visual elements may be displayed within the associated ring and some may be hidden, and when the visual elements are rotated within the ring, one or more of the visual elements may change from displayed to hidden and in turn one or more other visual elements may be changed from hidden to displayed. The visual elements may change displayed-to-hidden and hidden-to-displayed in a one-to-one correspondence. A part of the ring may be defined as a transition location, such that visual elements are hidden approaching that part and displayed coming from that part. The part may be a line or a segment or a visual element overlaying the ring. The part may be at a fixed orientation within the display (for example, at the top of the ring). In another embodiment, the part may be moved by the user to a different location on the ring. The part may be user actuate-able. Upon actuation by the user, a new visual element may be added to the ring. The new visual element may be customised with a name, colour, and/or icon.

In one embodiment, visual elements within rings can be rearranged within the rings, for example, in response to user input which may comprise a "dragging and dropping" user input event to reorder a visual element from one location within the ring to another within the ring.

In one embodiment, additional visual elements can be added to a ring by a user, for example, in response to user input which may comprise actuation of a displayed customisation visual element (such as a segment within a ring displaying, for example, a "+" logo) and selection of one or more from a list of possible additional visual elements. In one embodiment, a user can delete or change the colour of visual elements to a ring.

In one embodiment, the functionality or content may include display of another visual object comprising additional visual elements, some of which are displayed in a ring surrounding the second visual object. Each of additional visual elements may be associated with further functionality or content, and the further functionality or content may be yet another visual object comprising yet additional visual elements, and so on. In one embodiment, one or more of the inner rings may be hidden when a ring outside the currently displayed ring is displayed. For example, in one embodiment, every ring innermost from the second outermost ring up to, but not including, the third visual object ring may be hidden.

In one embodiment, a background to the visual objects may be displayed. The background may be a colour, colour gradient, image or other static/animation visual design. A user may actuate the background (for example, by touch/double touch/hard touch on a touch-screen/3D touch-screen) to change the background (e.g. colour, image, style, etc).

In one embodiment, display of visual objects and detection of user input events steps as described above are performed directly by the operating system layer 204. Alternatively, they are performed by a user interface library which exposes an API via the user interface API layer 202. It will be appreciated that in possible embodiments, the steps may be performed by application software within layer 201 interfacing with one or more of layers 202 or 203.

FIGS. 4a to 4f show images of a device illustrating user interactions within a graphical user interface in accordance with an embodiment of the invention.

Figure 4B:
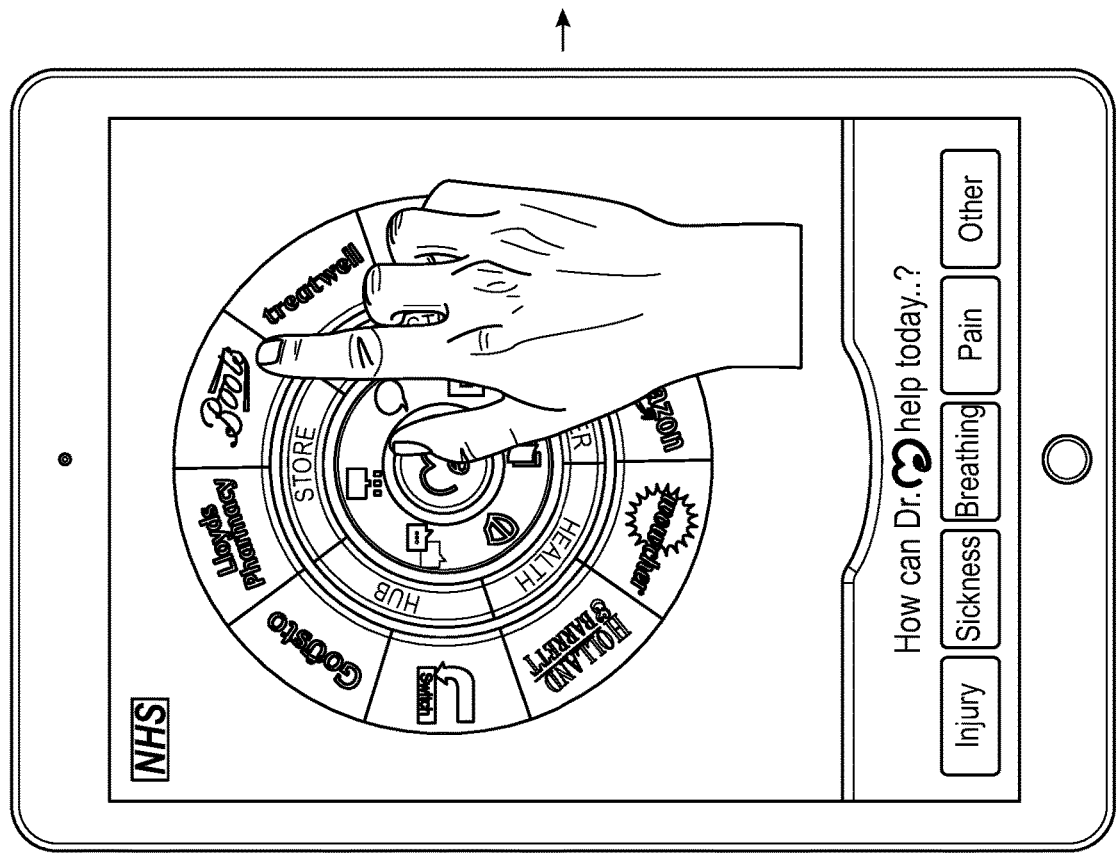
FIGS. 4a to 4f: show a series of images of a device illustrating a graphical user interface in accordance with an embodiment of the invention.
Figure 4A:
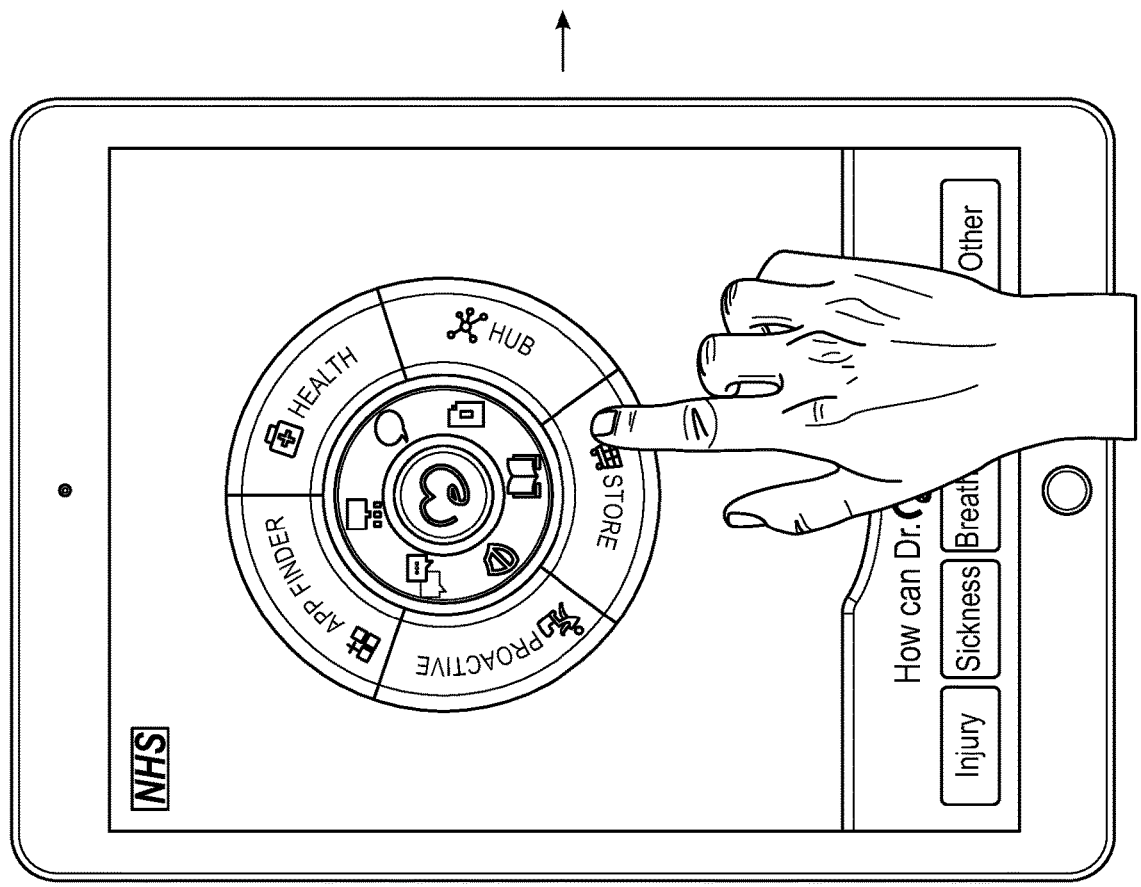

In FIG. 4a, a first visual object is displayed to the user within a graphical user interface. The first visual object comprises a plurality of visual elements labelled: Store, Proactive, App Finder, Health, Hub, and arrayed in a ring surrounding an inner ring of icons which in turn surrounds another central visual object.

In FIG. 4a, a user input event is detected when a user touches a touch-screen at the visual element labelled "Store".

In response to the user input event, a second visual object comprising ten visual elements displayed in ring surrounding the first visual object is shown in FIG. 4b. The visual state of the visual elements of the first visual object is changed to a visual state where the visual elements are reduced in size, and the "selected" Store visual element is displayed at the top of the first visual object ring. Other visual elements within that ring are reduced in hue intensity.

Another user input event is detected when the user touches the touch-screen at the location for the "Boots" visual element.

Figure 4D:
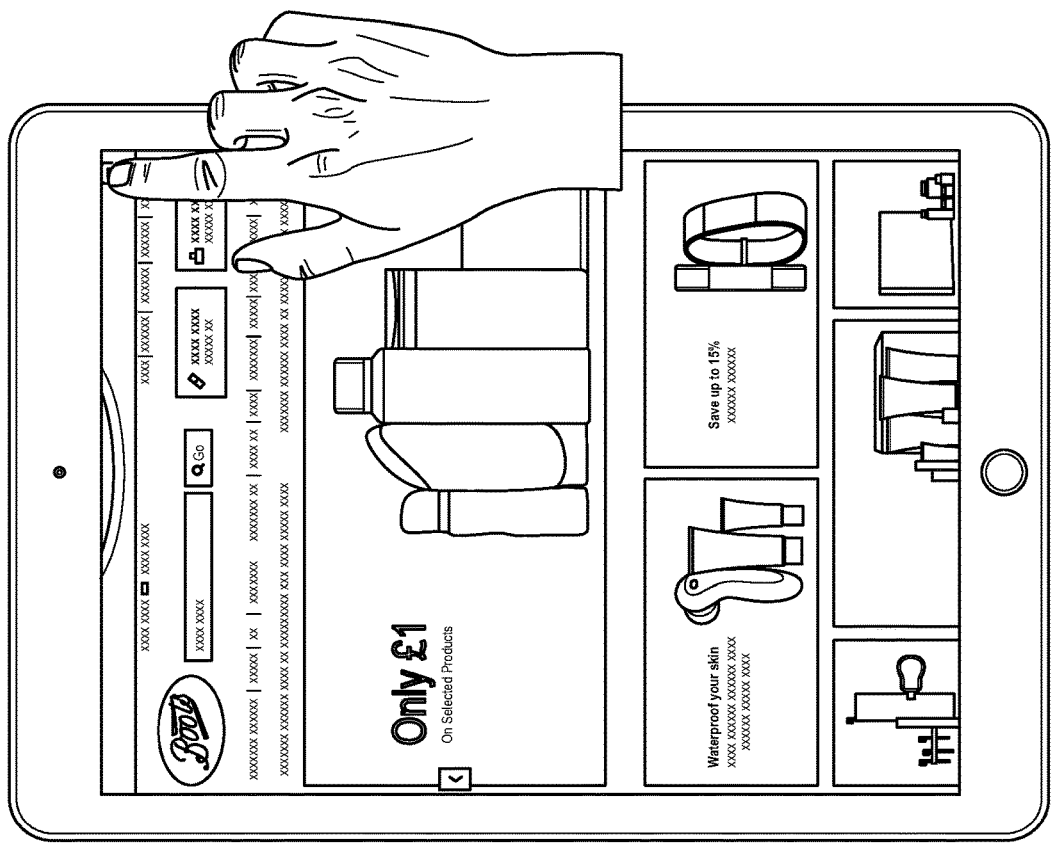
Figure 4C:
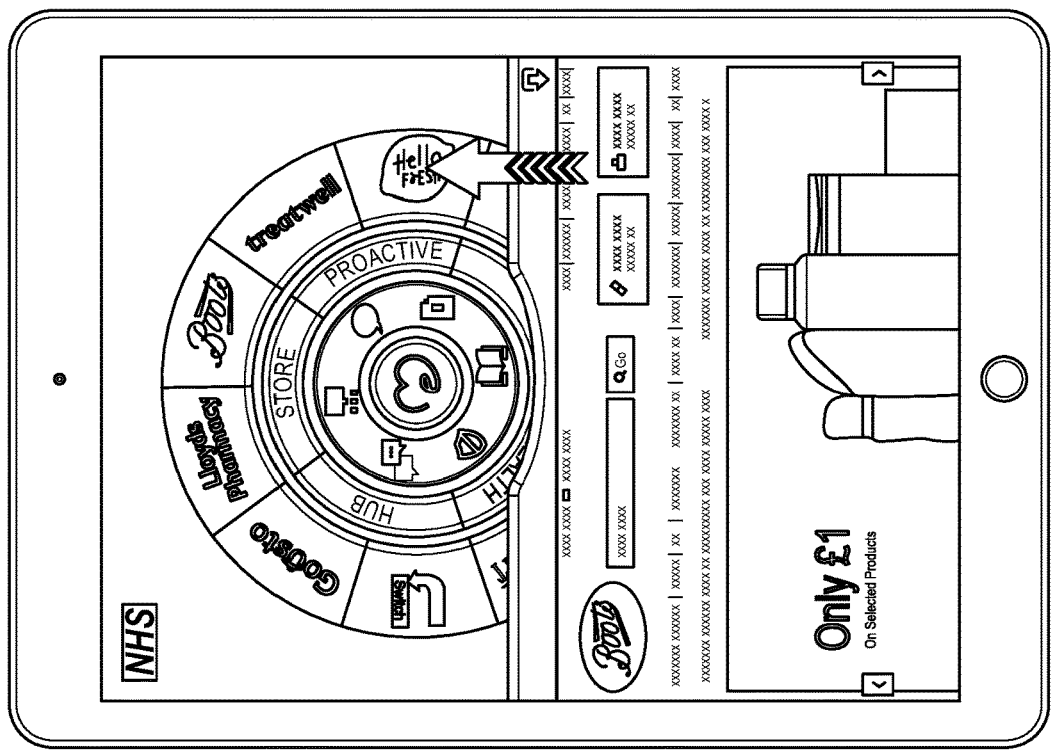

In FIGS. 4c and 4d, and in response to that second user event, functionality and content is provided by the display of a Boots website within a browser visual module or a Boots app within a visual module. The visual module rises from the bottom of the screen to the top of the screen in FIG. 4d.

Figure 4F:
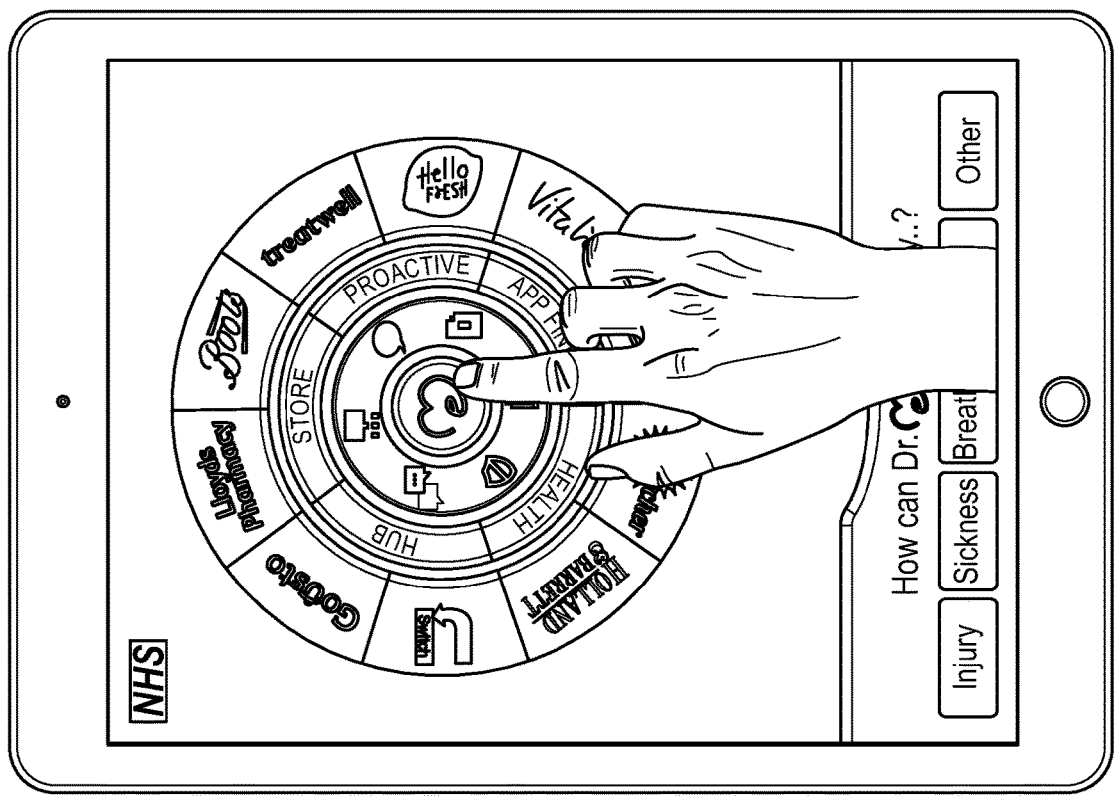
Figure 4E:
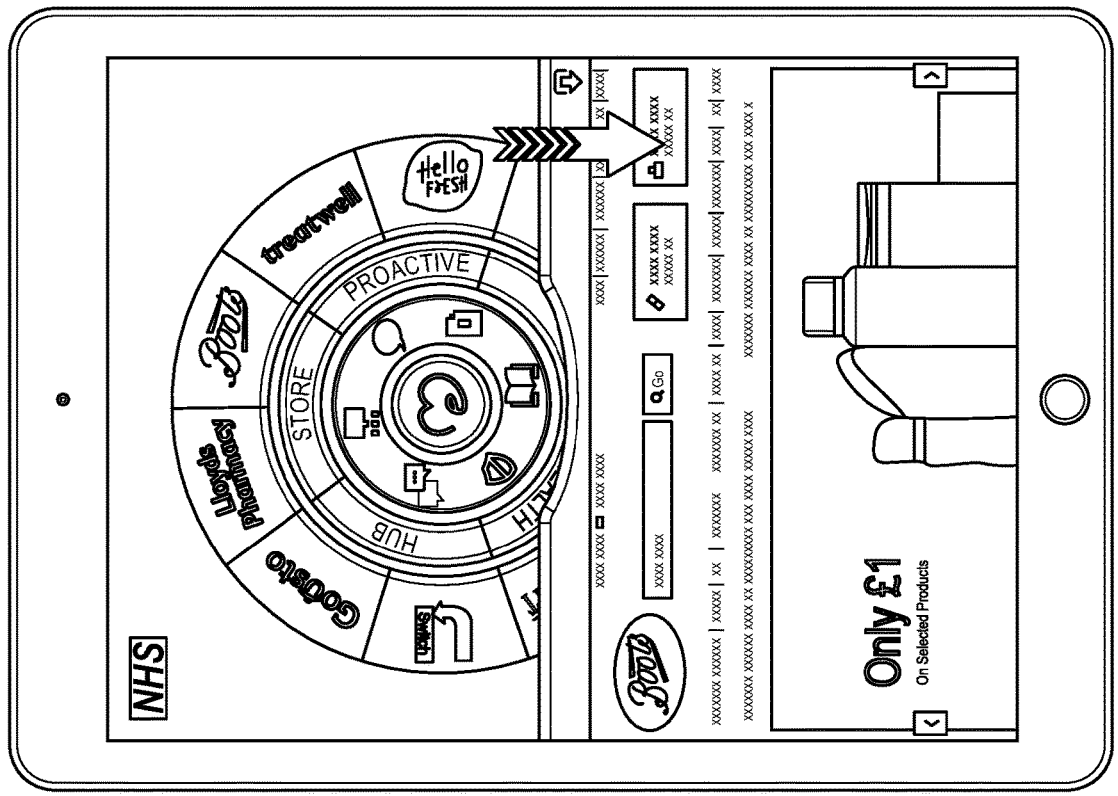

In FIG. 4d, a user input event may be detected to close the visual module which lowers to the bottom of the screen in FIG. 4e.

In FIG. 4f, a user input event may be detected at the central visual object. In response to this user event, the second visual object may be hidden and the visual elements of the first visual object may be returned to their original visual state as shown in FIG. 4a.

Figure 5B:
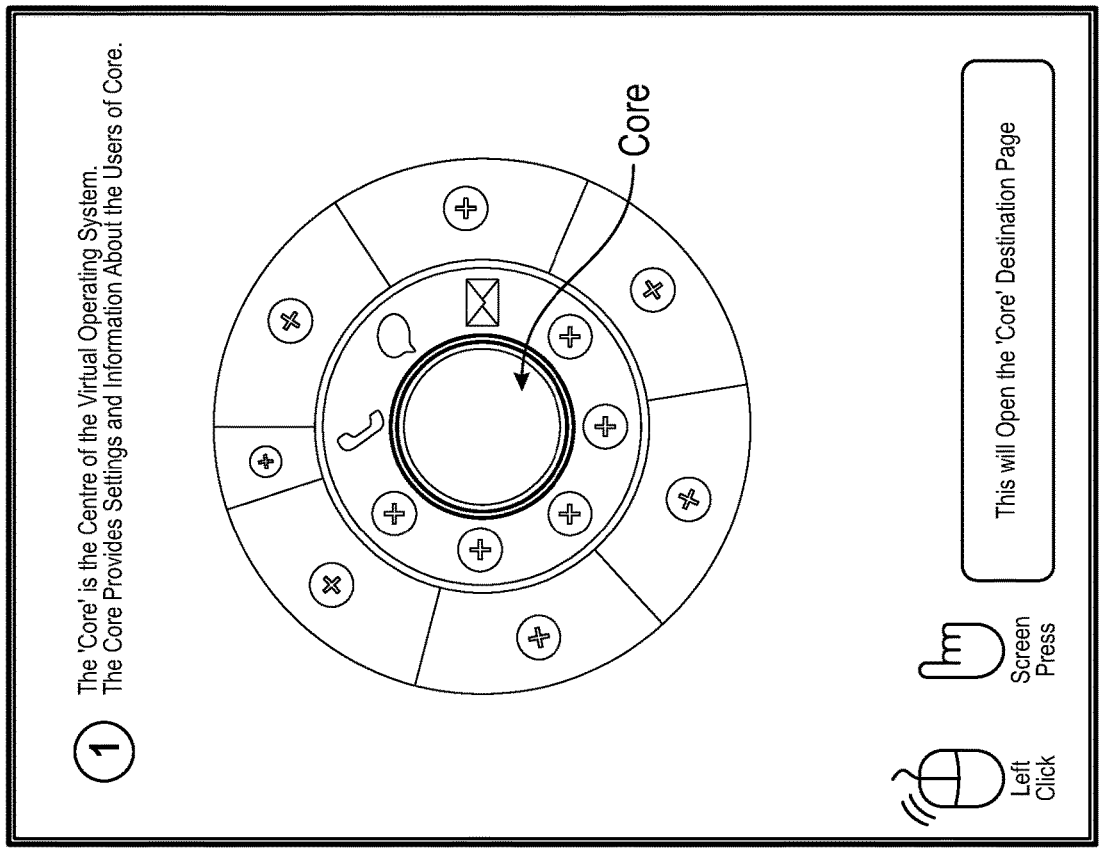
FIGS. 5a to 5t: show a series of diagrams illustrating functionality of a graphical user interface in accordance with embodiments of the invention.
Figure 5A:
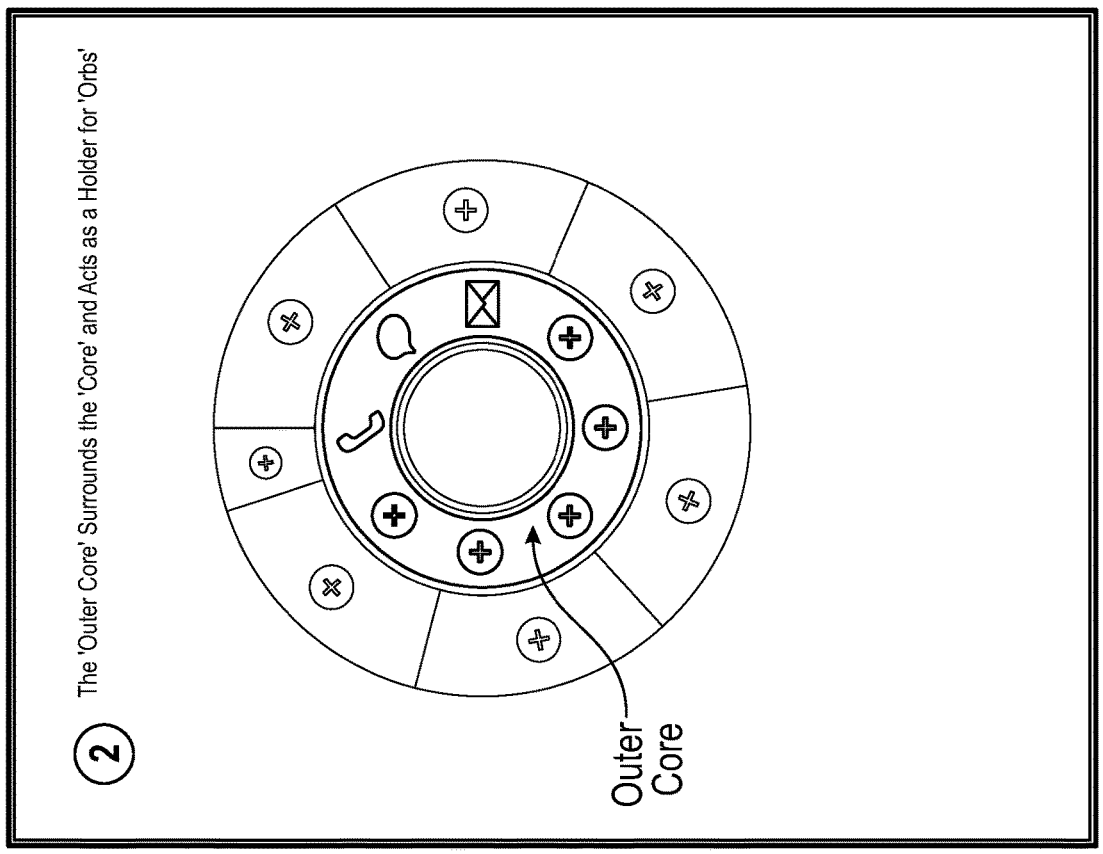
Figure 5D:
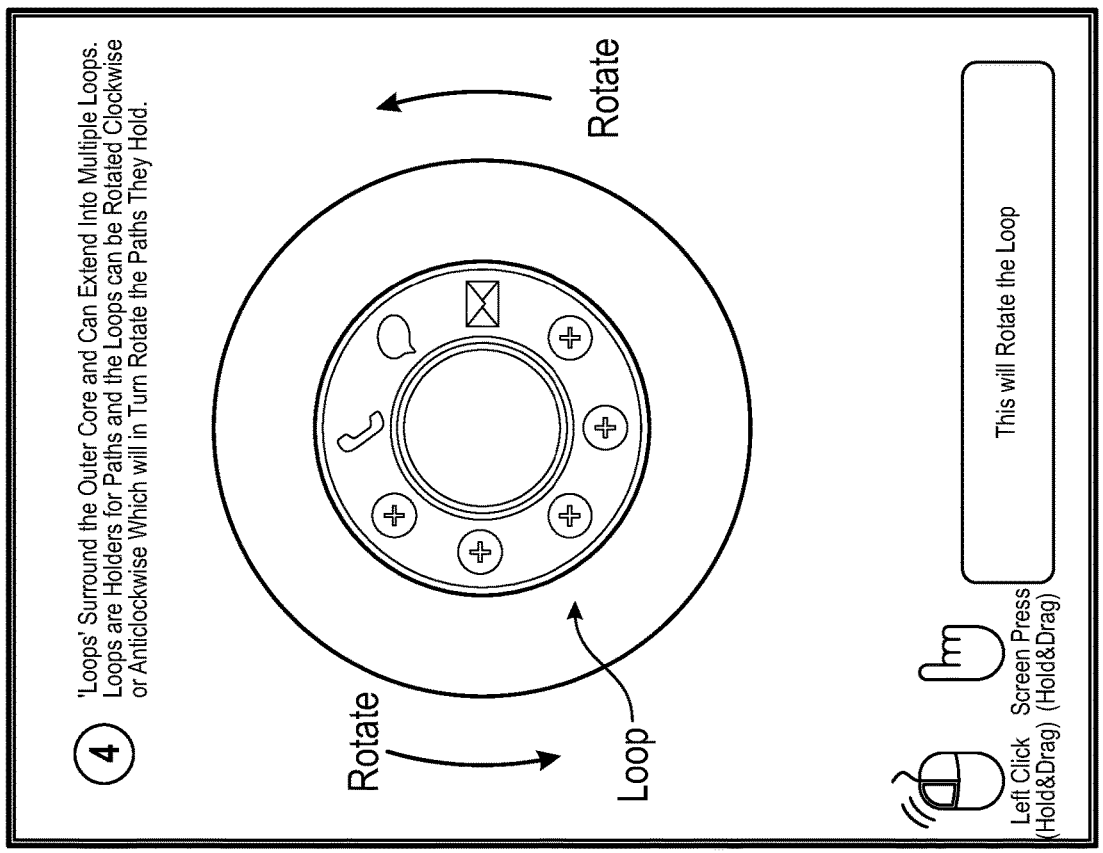
Figure 5C:
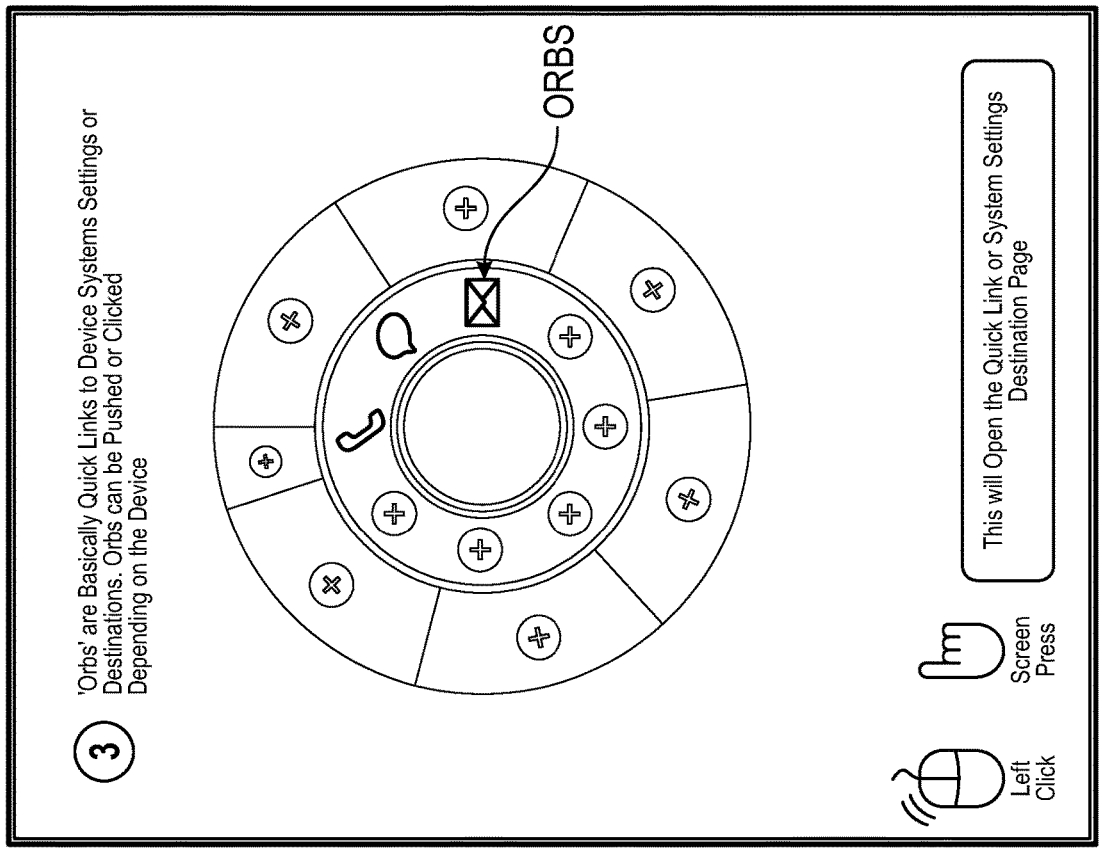
Figure 5F:
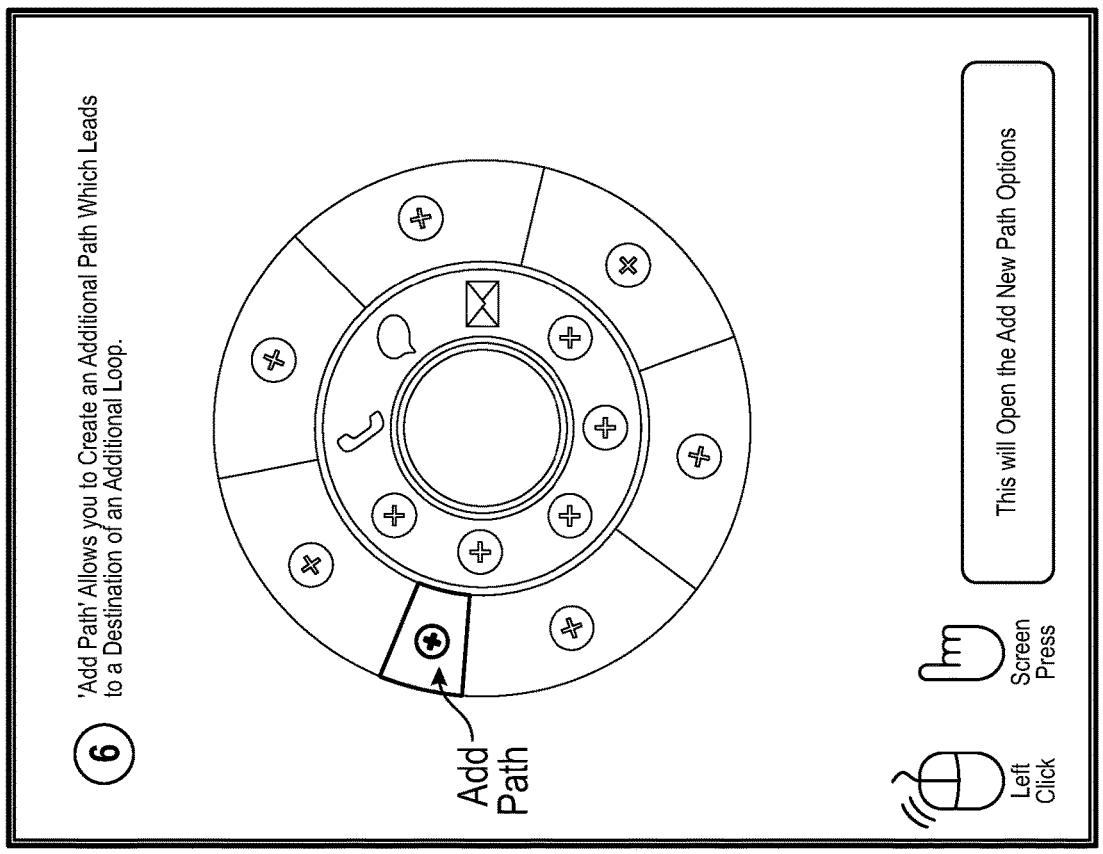
Figure 5E:
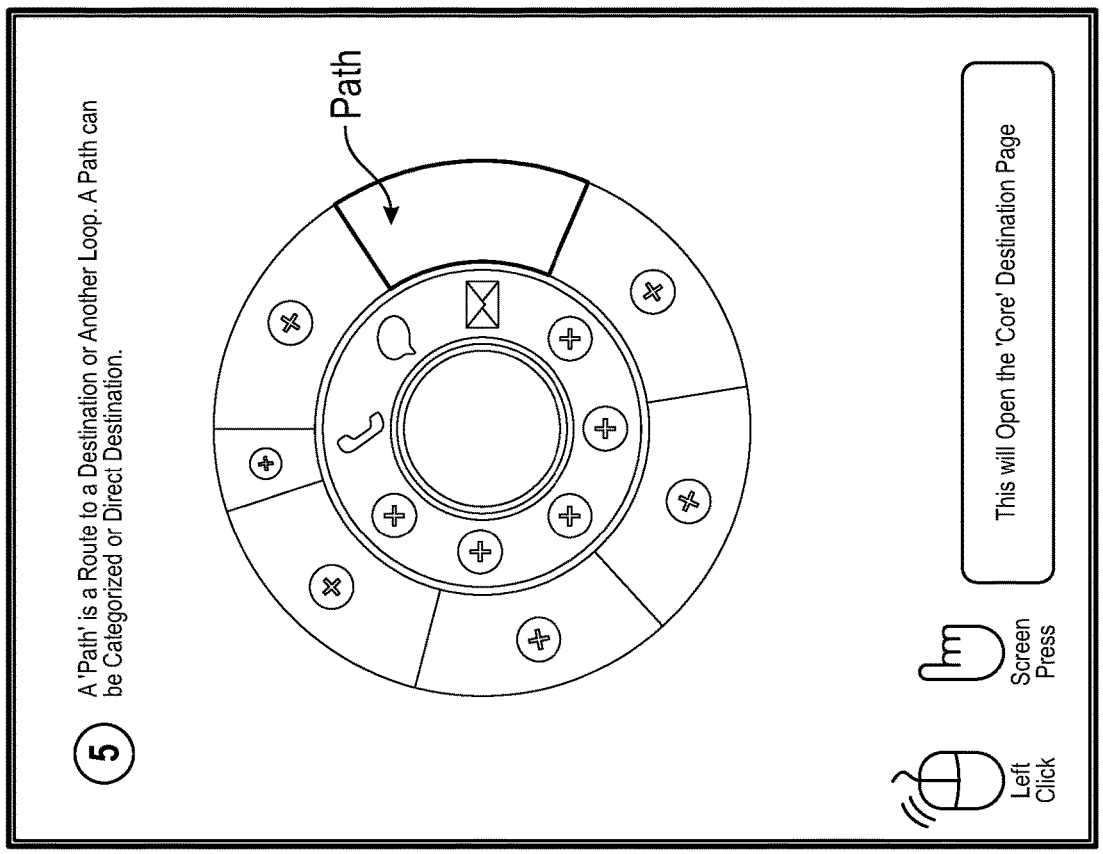
Figure 5H:
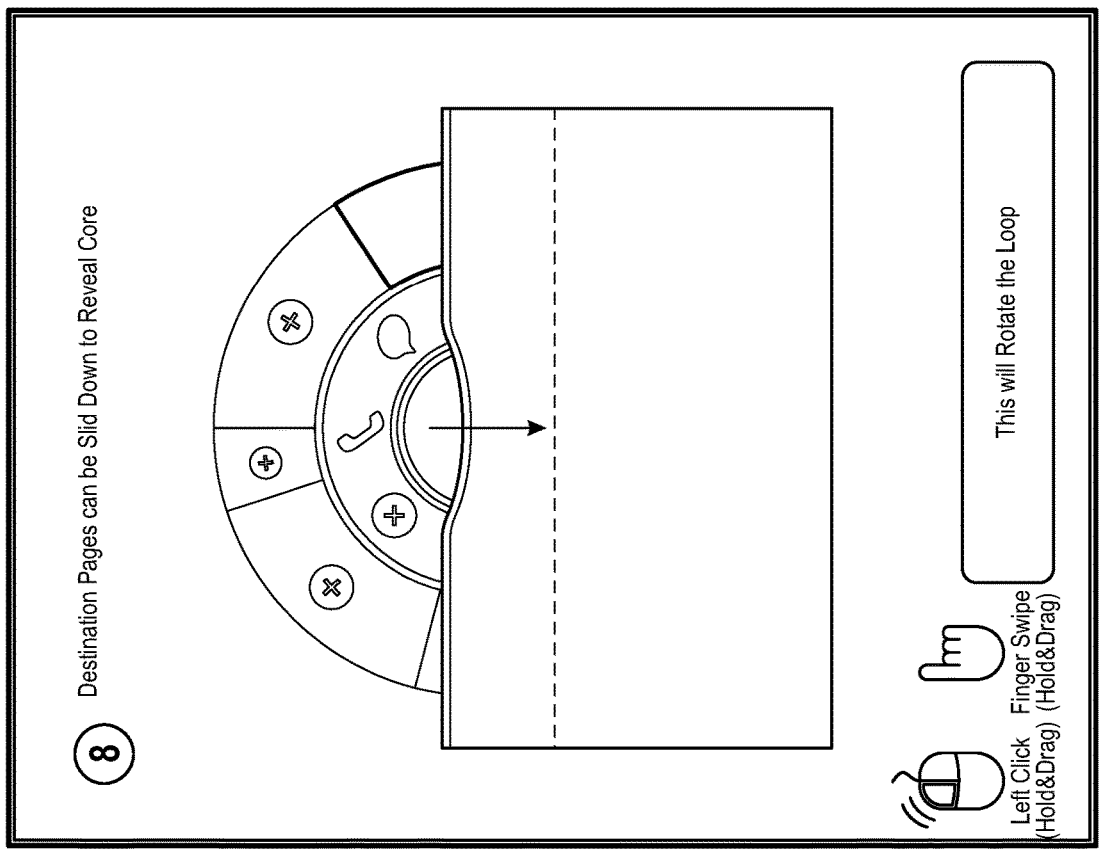
Figure 5G:
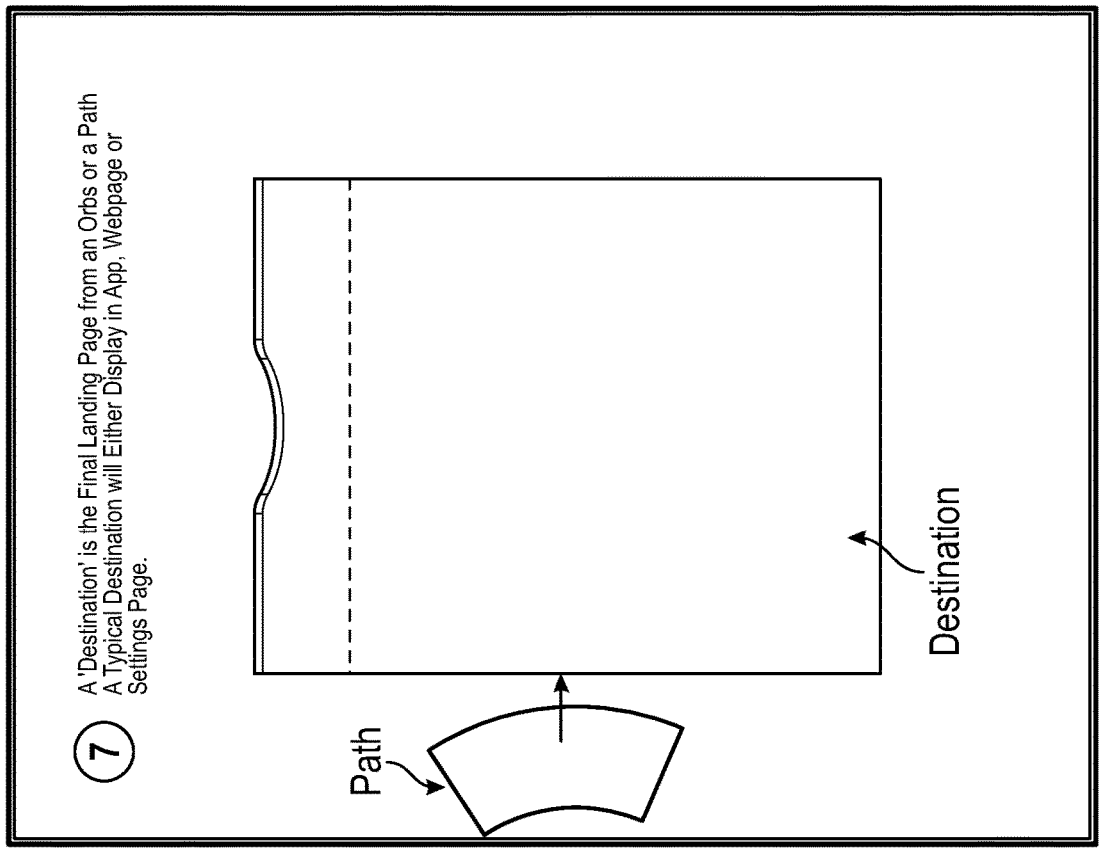
Figure 5J:
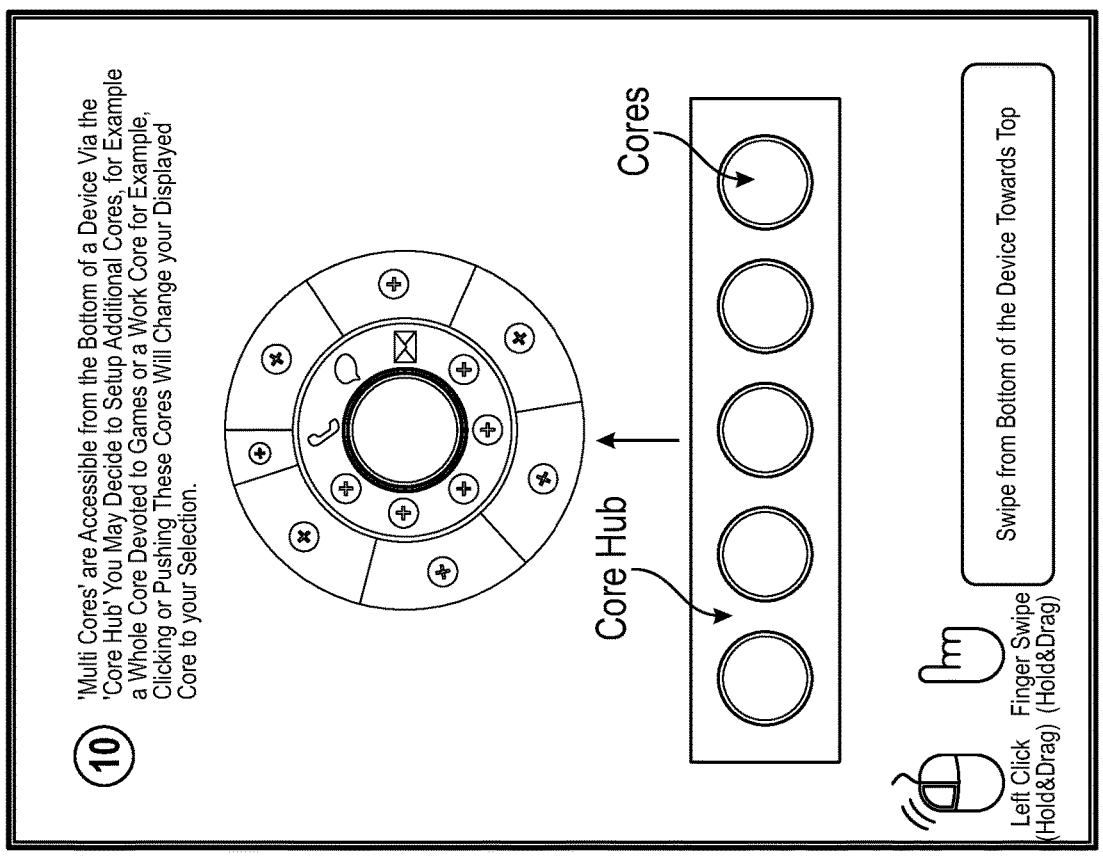
Figure 5I:
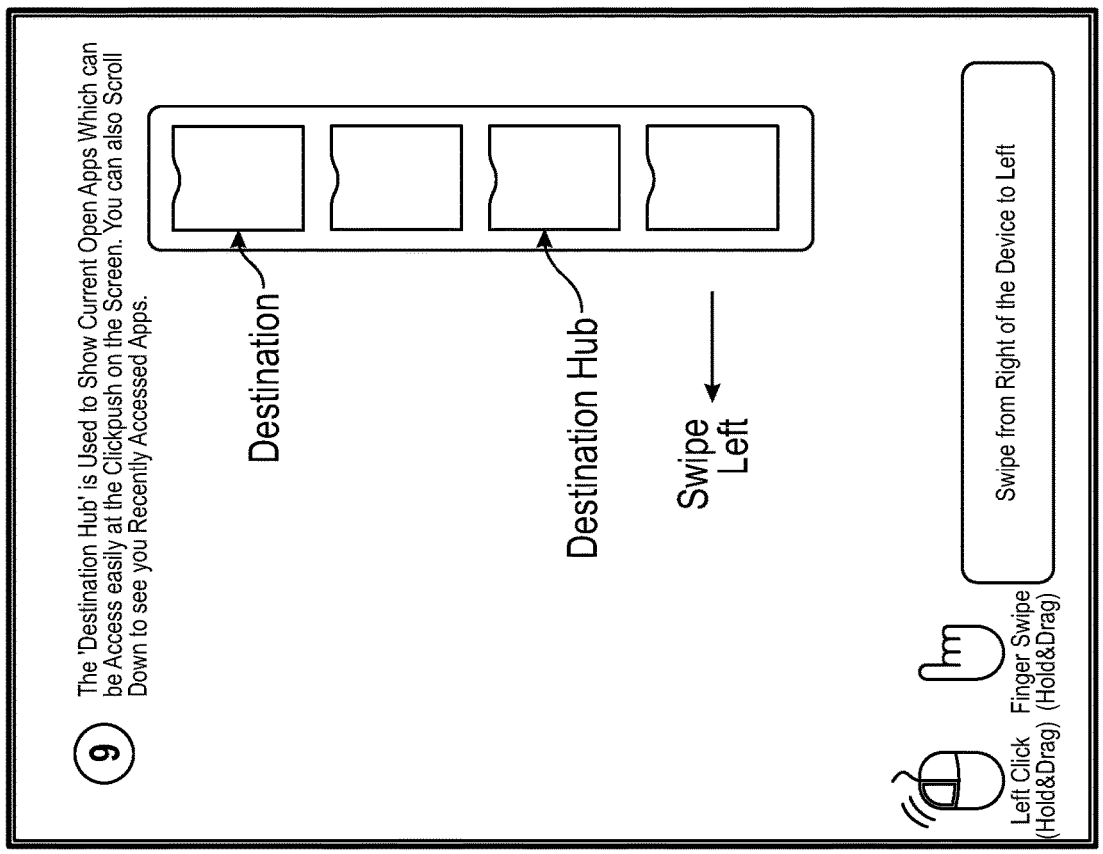
Figure 5N:
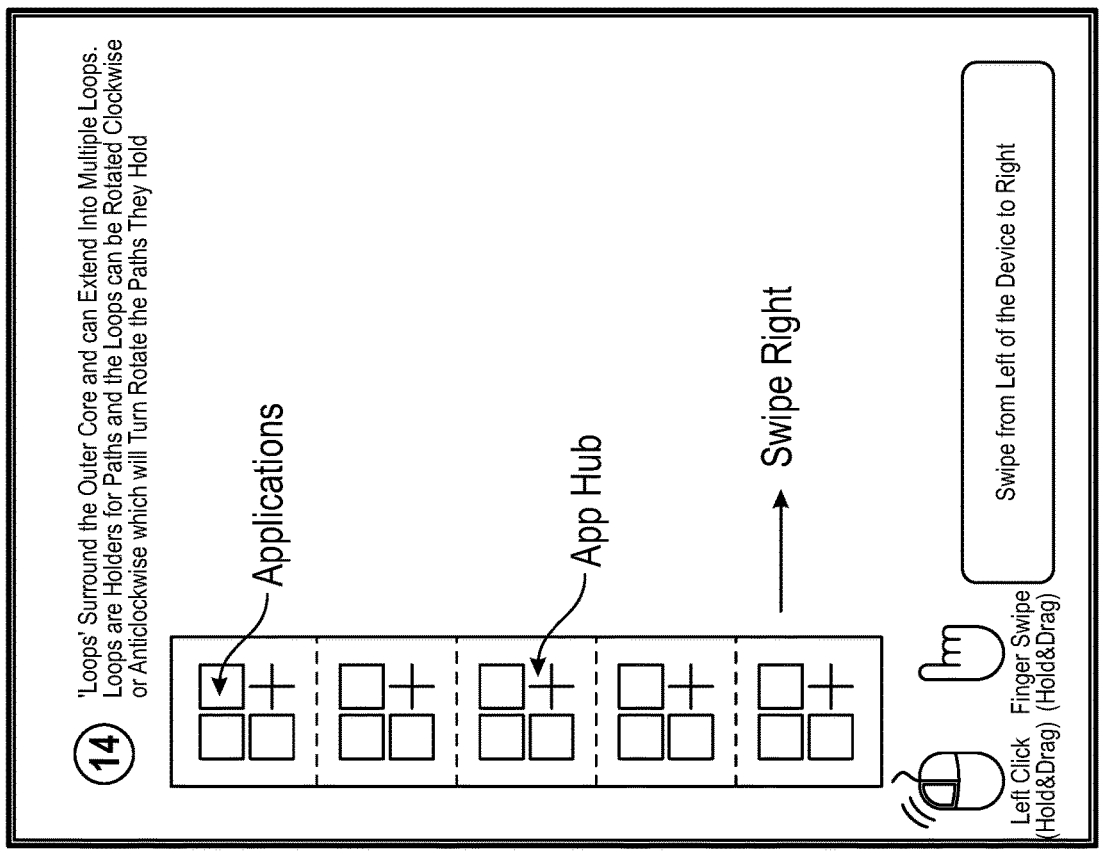
Figure 5M:
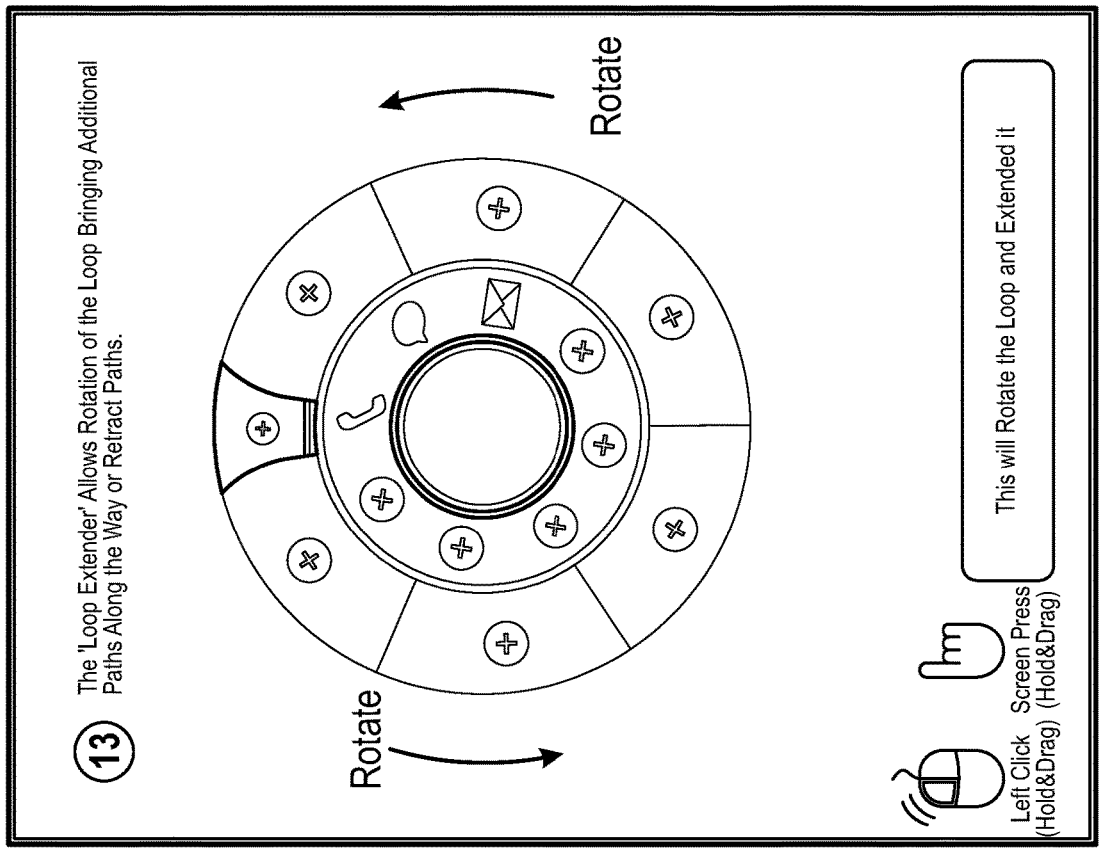
Figure 5P:
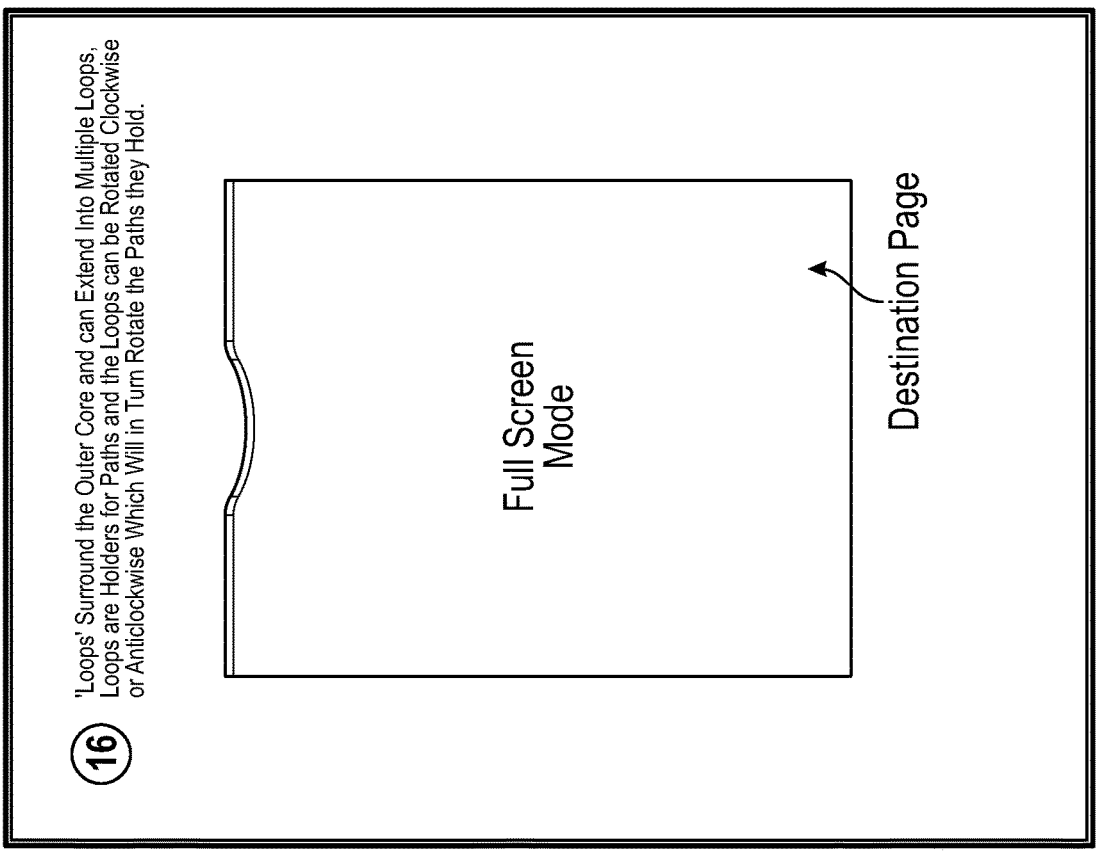
Figure 5O:
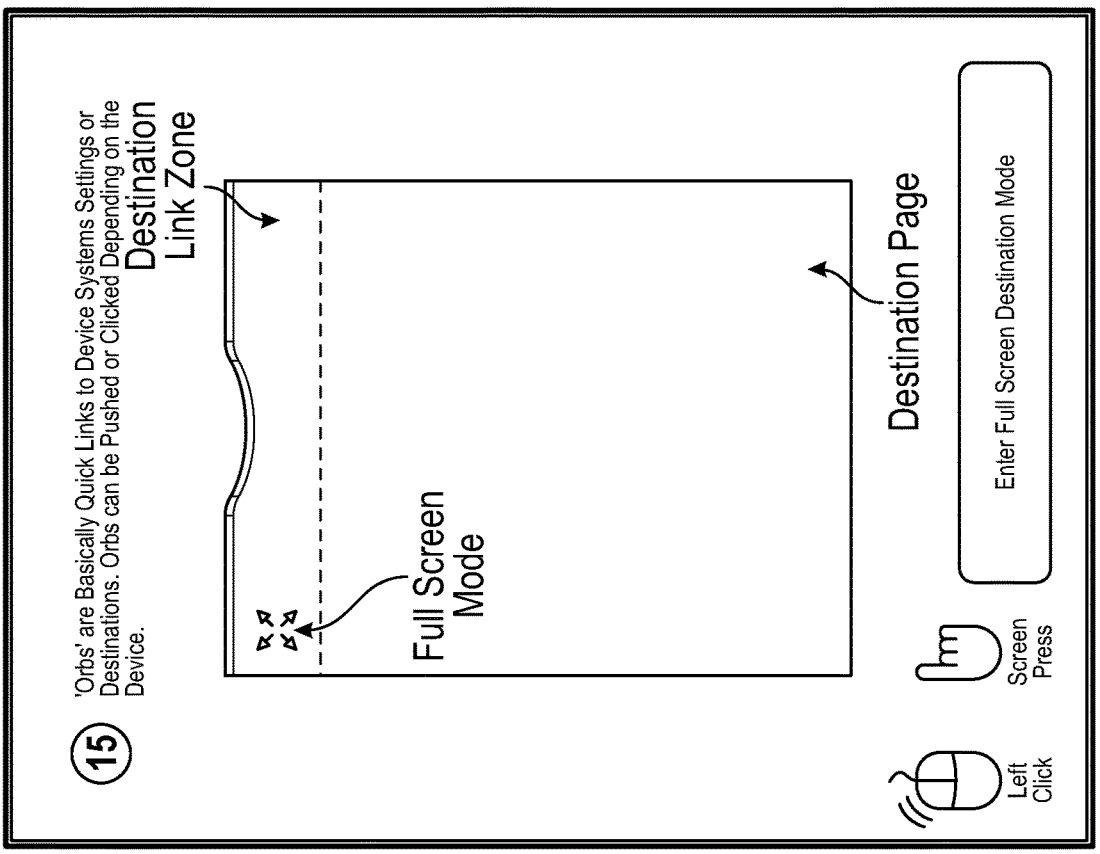
Figure 5R:
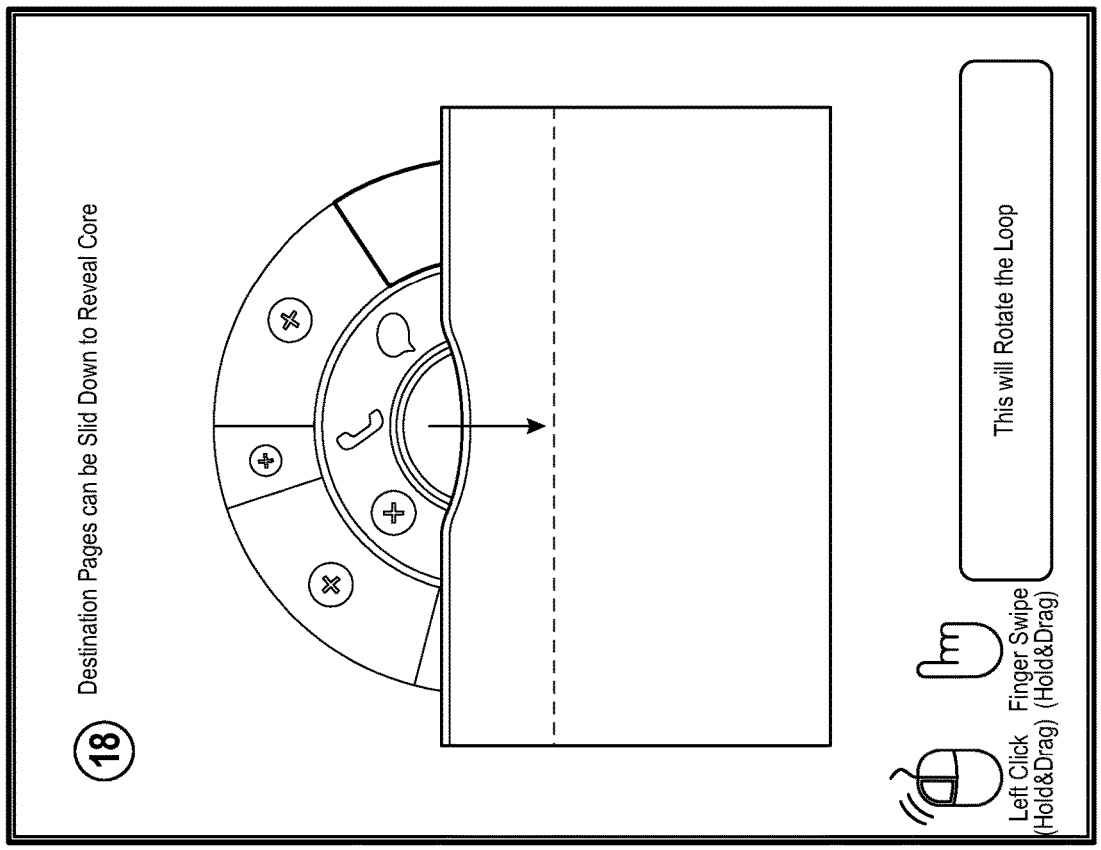
Figure 5Q:
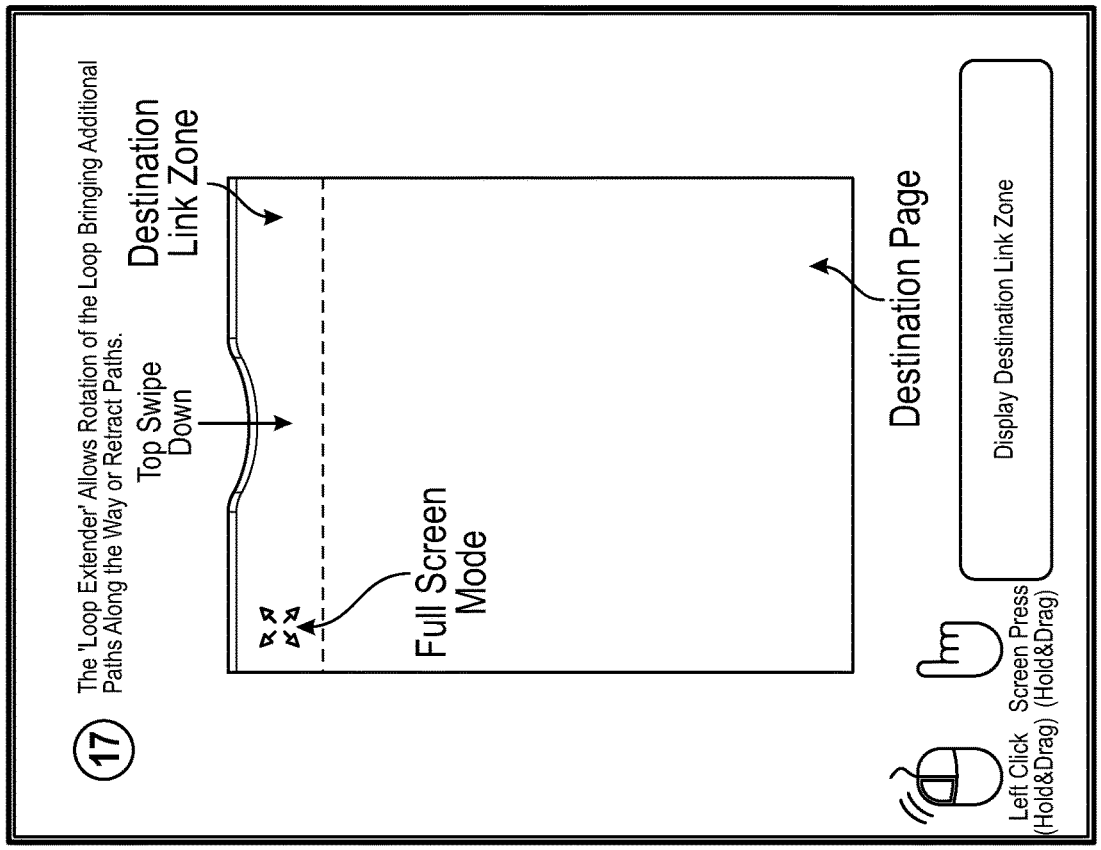
Figure 5T:
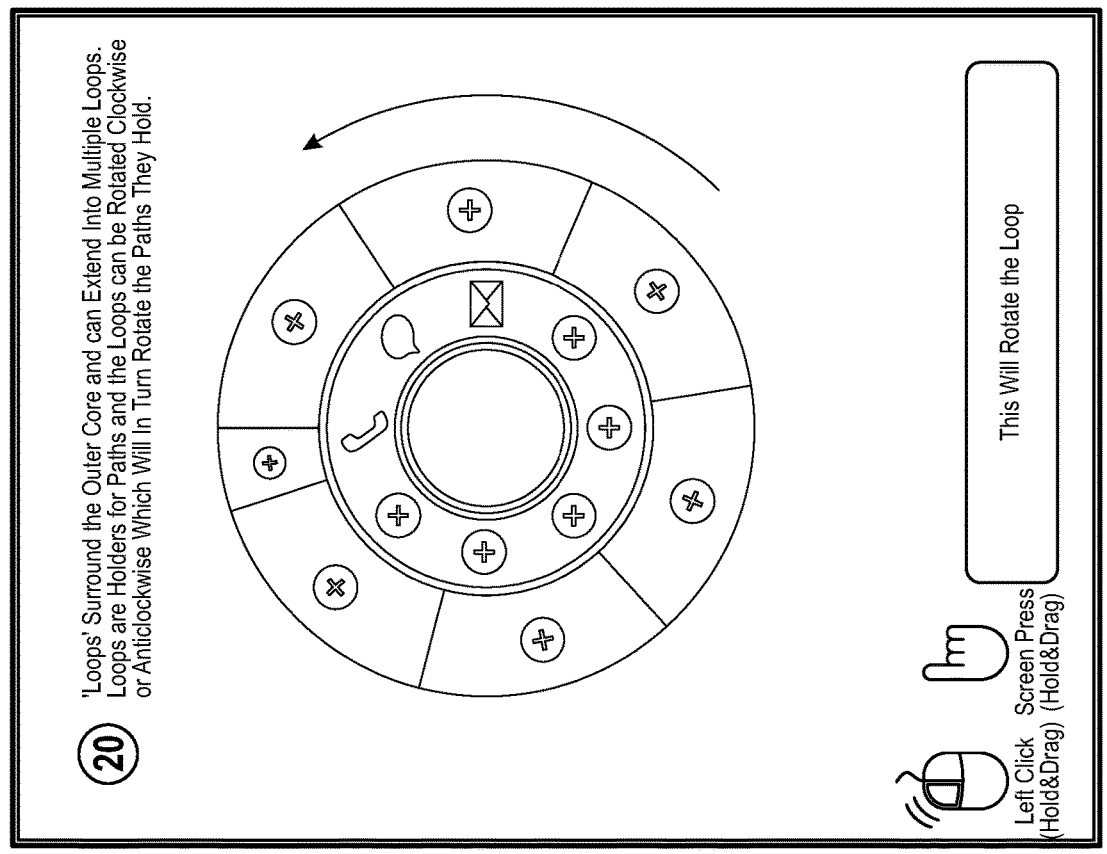
Figure 5S:
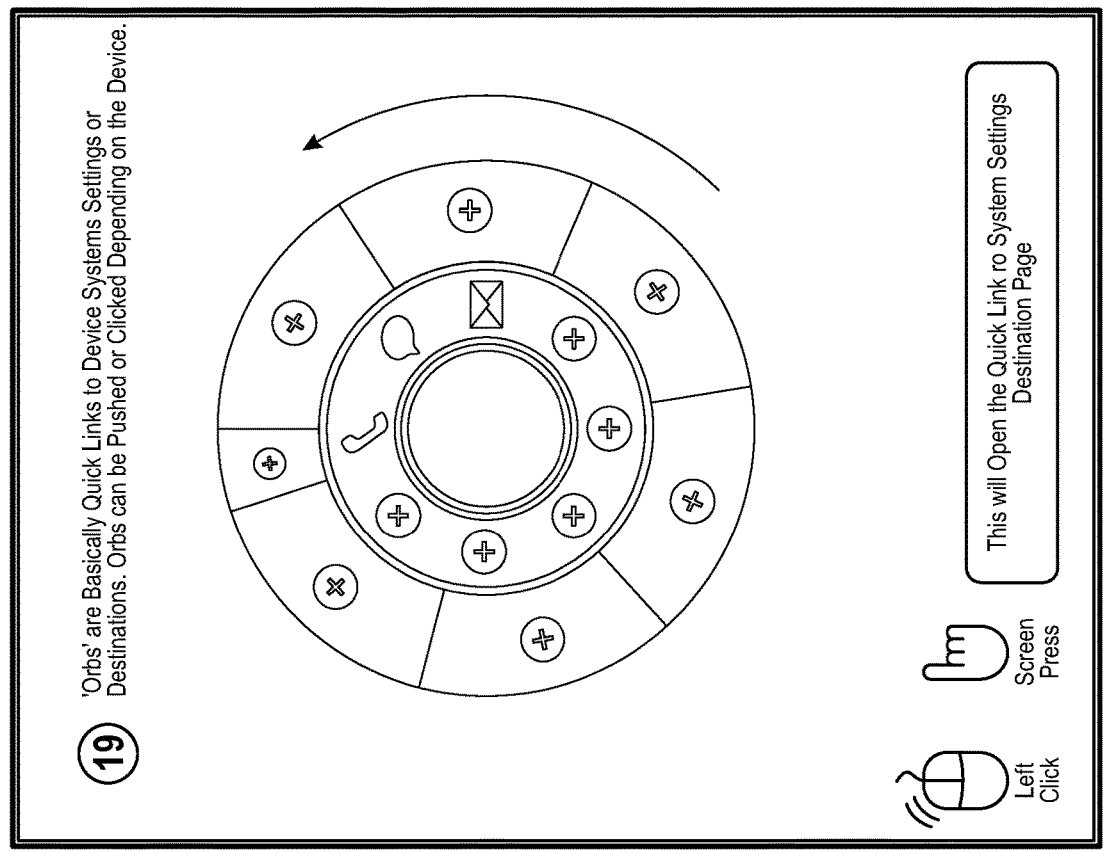

FIGS. 5a to 5t show diagrams illustrating functionality of a graphical user interface in accordance with embodiments of the invention.

FIG. 5a illustrates a central visual object within a GUI—"Core".

FIG. 5b illustrates visual object comprising a ring surrounding the central visual object—"Outer Core".

FIG. 5c illustrates user actuate-able visual elements corresponding to functionality—"Orbs".

FIG. 5d illustrates another visual object—"Loop". The visual object comprise a series of visual elements ("Paths") arrayed in a ring (as shown in FIG. 5e) which can be rotated in response to user input.

FIG. 5e illustrates the visual elements "Paths" as segments within the ring forming the Loop.

FIG. 5f illustrates addition of new Paths to the Loop.

FIG. 5g illustrates display of a destination page (e.g. within an app) in response to user actuation of a Path.

FIG. 5h illustrates user slide-able control of the destination page within the GUI.

FIG. 5i illustrates access to currently open apps (e.g. as opened in response to actuation of a Path).

FIG. 5j illustrates swapping in a new Core in response to user actuation. Each Core may correspond to a new associated outer core and loop.

FIG. 5k illustrates that a Path may be visually represented by an icon or logo.

FIG. 5l illustrates customisation of the graphical user interface by the user.

FIG. 5m illustrates visibility provided to non-visible paths within the loop and hiding of visible paths.

FIGS. 5n to 5t describe other optional functionality for embodiments of the present invention.

Potential advantages of some embodiments of the present invention are that nested access to functionality may be provided to the user within a compact user interface, contextual information may be indicated to the user within a compact user interface, and a graphical user interface is provided to developers which simplifies development of nested access systems. At least some of these advantages may thus provide an improved graphical user interface which in turn provides an improved device.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A computer-implemented method of controlling an electronic device with a display and a user input, including:
displaying a first visual object within a graphical user interface, wherein the first visual object comprises a plurality of first visual elements, and wherein the plurality of first visual elements are displayed in a first visual state in a first complete ring within the graphical user interface;
detecting a first user input event at one of the first visual elements;
in response to the first user input event, reducing a size of the displayed first visual object and displaying a second visual object within the graphical user interface, wherein the second visual object comprises a plurality of second visual elements, and wherein the plurality of second visual elements are displayed in a second complete ring surrounding the first visual object within the graphical user interface;
detecting a second user input event at one of the second visual elements;
in response to the second user input event, controlling the electronic device to access functionality or content associated with the second visual element;
detecting a third user input event at one of the second visual elements, wherein the third user input event includes user input movement; and
in response to the user input movement of the third user input event exceeding a threshold, rotating the second visual elements of the second visual object around the second complete ring displayed within the graphical user interface, wherein during the rotation of the second visual elements around the second complete ring, at least one of the second visual elements is hidden from the second complete ring when the at least one of the second visual elements crosses into a transition visual element provided at a transition location of the second complete ring and at least one new second visual element is revealed from the transition visual element at the transition location of the second complete ring and displayed in the second complete ring when the at least one of the second visual elements crosses into the transition location,
wherein the functionality includes displaying another visual object comprising a plurality of third visual elements, at least some of the third visual elements being displayed in a ring within the graphical user interface and surrounding the second visual object, and hiding the second visual object and/or the first visual object displayed within the graphical user interface.

2. The method as claimed in claim 1, wherein the plurality of second visual elements are associated with the one of the first visual elements.

3. The method as claimed in claim 1, wherein at least some of the plurality of first visual elements are associated with a plurality of second visual elements.

4. The method as claimed in claim 1, further including, in response to the first user input event, changing the first visual elements from the first visual state to a second visual state within the graphical user interface.

5. The method as claimed in claim 1, wherein the electronic device is controlled to access functionality or content by transmitting an operating system message to an application.

6. The method as claimed in claim 5, wherein the application is executing on the electronic device.

7. The method as claimed in claim 1, wherein the graphical user interface is executing within a graphical user interface layer within an operating system.

8. The method as claimed in claim 1, wherein the graphical user interface is executing as a software library on the electronic device.

9. The method as claimed in claim 1, wherein the first visual elements are displayed in the first complete ring surrounding a third visual object.

10. The method as claimed in claim 9, wherein the third visual object comprises a plurality of fourth visual elements.

11. The method as claimed in claim 10, wherein at least some of the fourth visual elements are displayed in a third ring within the graphical user interface.

12. The method as claimed in claim 1, wherein at least one of the first and second visual objects includes a customisation visual element, and wherein actuation of the customisation visual element facilitates the addition of a new visual element to that visual object.

13. The method as claimed in claim 1, further including detecting a fourth user input event at one of the first or second visual elements at one of the first or second visual objects; and in response to the fourth user input event, facilitating rearrangement of the first or second visual element within the first or second ring at the first or second visual object.

14. The method as claimed in claim 4, wherein the second visual state is smaller than the first visual state.

15. The method as claimed in claim 1, further including: in response to the first user input event, rotating the first visual elements within the first complete ring within the graphical user interface until the one of the first visual elements is at the top of the ring.

16. The method as claimed in claim 1, wherein each displayed first and second visual element forms a segment within the first or second ring within the graphical user interface.

17. An electronic device, including:
a display;
one or more processors;
memory;
a user input; and
one or more programs wherein the one or more programs are stored in the memory and configured to be executed by the one or more processors, the programs including instructions for:
displaying a first visual object within a graphical user interface; wherein the first visual object comprises a plurality of first visual elements, and wherein the first visual elements are displayed in a first visual state in a first complete ring within the graphical user interface;
detecting a first user input event at one of the first visual elements;
in response to the first user input event, reducing a size of the displayed first visual object and displaying a second visual object within the graphical user interface; wherein the second visual object comprises a plurality of second visual elements, and wherein the second visual elements are displayed in a second complete ring surrounding the first visual object within the graphical user interface;
detecting a second user input event at one of the second visual elements;
in response to the second user input event, controlling the electronic device to access functionality or content associated with the second visual element;

detecting a third user input event at one of the second visual elements, wherein the third user input event includes user input movement; and in response to the user input movement of the third user input event exceeding a threshold, rotating the second visual elements of the second visual object around the second complete ring displayed within the graphical user interface, wherein during the rotation of the second visual elements around the second complete ring, at least one of the second visual elements is hidden from the second complete ring when the at least one of the second visual elements crosses into a transition visual element provided at a transition location of the second complete ring and at least one new second visual element is revealed from the transition visual element at the transition location of the second complete ring and displayed in the second complete ring when the at least one of the second visual elements crosses into the transition location, wherein the functionality includes displaying another visual object comprising a plurality of third visual elements, at least some of the third visual elements being displayed in a ring within the graphical user interface and surrounding the second visual object, and hiding the second visual object and/or the first visual object displayed within the graphical user interface.

18. The electronic device of claim 17, wherein one of the second visual elements in the second visual object includes a customisation visual element, and wherein the programs further include instructions for: actuation of the customisation visual element in response to a user input to the customisation visual element, and facilitating the addition of a new visual element to the second visual object with a user selected name and a user selected icon.

19. The electronic device of claim 17, wherein a location of the transition visual element is user defined on the second complete ring.

20. The electronic device of claim 17, wherein the second complete ring includes the transition visual element and the transition visual element is a line.

21. The electronic device of claim 17, wherein the second visual elements are selected from a list of second elements, and wherein the new second visual element is selected from the list of second elements.

22. The electronic device of claim 21, wherein the size of the second complete ring is independent of a size of the list of second elements.

23. The electronic device of claim 17, wherein the first and second complete rings are displayed on a same plane and the second visual elements rotate on the plane.

24. The electronic device of claim 17, wherein the transition visual element overlaps the second complete ring.

25. An electronic device, including:
a display;
one or more processors;
memory;
a user input, wherein the one or more processors are configured to:
display a first visual object within a graphical user interface; wherein the first visual object comprises a plurality of first visual elements, and wherein the first visual elements are displayed in a first visual state in a first complete ring within the graphical user interface;
detect a first user input event at one of the first visual elements;
in response to the first user input event, reduce a size of the displayed first visual object and displaying, simultaneously with the first visual object, a second visual object within the graphical user interface, wherein the second visual object comprises a plurality of second visual elements, and wherein the second visual elements are displayed in a second complete ring surrounding the first visual object within the graphical user interface;
detect a second user input event at one of the second visual elements;
in response to the second user input event, control the electronic device to access functionality or content associated with the second visual element;
detect a third user input event at one of the second visual elements, wherein the third user input event includes user input movement; and
in response to the user input movement of the third user input event exceeding a threshold, rotate the second visual elements of the second visual object around the second complete ring displayed within the graphical user interface, wherein during the rotation of the second visual elements around the second complete ring, at least one of the second visual elements is hidden from the second complete ring when the at least one of the second visual elements crosses into a transition visual element provided at a transition location of the second complete ring and at least one new second visual element is revealed from the transition visual element at the transition location of the second complete ring and displayed in the second complete ring when the at least one of the second visual elements crosses into the transition location, wherein the first and second complete rings are two dimensional rings and are displayed on a same plane, the first visual elements rotate on the plane, the second visual elements rotate on the plane, and the transition visual element is provided on a top portion of the second complete ring and overlaps the second complete ring, wherein the functionality includes displaying another visual object comprising a plurality of third visual elements, at least some of the third visual elements being displayed in a ring within the graphical user interface and surrounding the second visual object, and hiding the second visual object and/or the first visual object displayed within the graphical user interface.

* * * * *